(12) United States Patent
Braedt et al.

(10) Patent No.: US 12,221,191 B2
(45) Date of Patent: Feb. 11, 2025

(54) REAR DERAILLEUR

(71) Applicant: SRAM DEUTSCHLAND GmbH, Schweinfurt (DE)

(72) Inventors: Henrik Braedt, Hambach (DE); Matthias Mueller, Schweinfurt (DE)

(73) Assignee: SRAM DEUTSCHLAND GmbH, Schweinfurt (DE)

(*) Notice: Subject to any disclaimer, the term of this patent is extended or adjusted under 35 U.S.C. 154(b) by 686 days.

(21) Appl. No.: 17/540,507

(22) Filed: Dec. 2, 2021

(65) Prior Publication Data
US 2022/0177075 A1   Jun. 9, 2022

(30) Foreign Application Priority Data

| Dec. 3, 2020 | (DE) | ................. | 102020007377.8 |
| Jun. 29, 2021 | (DE) | ................. | 102021003319.1 |
| Nov. 30, 2021 | (DE) | ................. | 102021131414.3 |

(51) Int. Cl.
| *B62M 9/12* | (2006.01) |
| *B62M 9/125* | (2010.01) |
| *B62M 9/126* | (2010.01) |
| B62K 3/02 | (2006.01) |

(52) U.S. Cl.
CPC ............ *B62M 9/126* (2013.01); *B62M 9/125* (2013.01); *B62K 3/02* (2013.01)

(58) Field of Classification Search
CPC .......... B62M 9/126; B62M 9/125; B62K 3/02
See application file for complete search history.

(56) References Cited

U.S. PATENT DOCUMENTS

| 8,777,788 | B2* | 7/2014 | Kawakami | ........... B62M 9/1344 |
| | | | | 74/489 |
| 11,230,349 | B2* | 1/2022 | Liao | ..................... B62M 9/132 |
| 11,401,006 | B2* | 8/2022 | Braedt | ................... B62M 9/124 |
| 2015/0057890 | A1* | 2/2015 | Tamaizumi | ........... B62D 6/008 |
| | | | | 701/41 |
| 2018/0265169 | A1* | 9/2018 | Braedt | ................... B62K 25/02 |
| 2019/0291818 | A1* | 9/2019 | Braedt | ..................... B62M 9/12 |
| 2019/0322333 | A1 | 10/2019 | Braedt | |
| 2020/0298933 | A1 | 9/2020 | Braedt | |

(Continued)

FOREIGN PATENT DOCUMENTS

| CN | 108622302 | 10/2018 |
| CN | 110386220 | 10/2019 |

(Continued)

*Primary Examiner* — Kevin Hurley
*Assistant Examiner* — Marlon A Arce

(57) ABSTRACT

A rear derailleur is provided for the coaxial attachment on a portion of a bicycle frame rear tail while using an adapter that includes an adapter bolt and an adapter nut and has a dual-arm base element, a pivoting mechanism, a movable element and a chain guide assembly. The reference is distinguished by at least one engagement element which facilitates an indirect frictional engagement between the adapter nut, on the one hand, and at least one of a) an inner first arm of the base element, b) an axial internal side of the mounting portion and c) the adapter bolt, on the other hand. Said engagement element, in a defined pre-assembled state, acts in the sense of a reinforcement of a consequential rotational force being able to be exerted on the base element by the adapter bolt and the adapter nut.

15 Claims, 21 Drawing Sheets

(56) References Cited

U.S. PATENT DOCUMENTS

2021/0054929 A1    2/2021   Braedt et al.
2021/0188396 A1    6/2021   Braedt et al.

FOREIGN PATENT DOCUMENTS

| | | |
|---|---|---|
| CN | 111720506 | 9/2020 |
| CN | 112407136 | 2/2021 |
| CN | 113002690 | 6/2021 |
| DE | 102018001253 | 9/2018 |
| DE | 102018206104 | 10/2019 |
| DE | 102020201229 | 9/2020 |
| DE | 102020210354 | 2/2021 |
| DE | 102020132208 | 6/2021 |
| EP | 3388324 | 10/2018 |
| EP | 3556643 | 10/2019 |
| EP | 3712052 | 9/2020 |
| EP | 3782891 | 2/2021 |
| EP | 3838731 | 6/2021 |
| TW | 201834921 | 10/2018 |
| TW | 202039303 | 11/2020 |
| TW | 202124213 | 7/2021 |

\* cited by examiner

REAR DERAILLEUR

BACKGROUND

A bicycle may be equipped with a drive assembly, such as a chain drive, for example. Bicycle drive assemblies can be used for transmitting the torque from a cyclist to a rear road wheel in order for the bicycle to be driven. For example, a drive assembly can transmit the torque from a front chain wheel assembly by way of a chain to a rear chain wheel or a sprocket, for instance a sprocket of a so-called sprocket cassette or of a so-called sprocket pack, so as to drive a rear road wheel. Such a drive assembly can be referred to as a drive train.

Chain wheel modules for bicycles can have one or a plurality of individual chain wheels. The front chain wheels are generally referred to as chain rings. Chain rings can be fastened with the aid of fastening devices of various types. For example, a chain ring can be fastened with chain ring screws, or be assembled directly on the crank of a bicycle. The rear chain wheels are often referred to as sprockets. A plurality of rear chain wheels or sprockets can be referred to as a cassette, a sprocket cassette or a sprocket pack. Such a cassette is typically configured such that said cassette can be fastened to a free-wheeling part of a rear road wheel. For example, a cassette can be fastened to a free-wheeling member of a rear wheel with the aid of a splined and/or threaded connection.

The alignment of a front chain ring group and a rear sprocket cassette influences the performance of the chain. For example, a front chainring module can have a single chain ring which is in alignment with a specific sprocket of the rear sprocket cassette. When the chain connects the individual chain ring with this single rear sprocket that is substantially aligned, the chain is under minor or no lateral stress. However, when the chain is moved laterally toward another sprocket of the cassette, for example by a rear derailleur or a rear gear shift of a chain shift mechanism of the drive train, the chain is subjected to a certain degree of lateral stress. Corresponding lateral stress of the chain arises when the front chain ring module has a plurality of chain rings, the chain being moved between the latter by a front derailleur or a front gear shift of the chain shift unit.

The functional capability and the performance capability of the rear derailleur is of particular importance with a view to a good performance of such a chain shift unit, said rear derailleur also being referred to as the rear bicycle derailleur or the rear gear shift in the industry. Said rear derailleur not only serves for carrying out shift procedures by derailing the chain between a plurality of neighbouring sprockets of the sprocket set of the bicycle. A further and likewise very important function of the rear derailleur is guaranteeing a sufficient chain tension. To this end, a rear derailleur typically has the following construction. A base element, in the industry also referred to as a B knuckle, by way of which the derailleur is assembled on the bicycle, is provided. There is furthermore a movable element, in the industry also referred to as a P knuckle, which is movably coupled to the base element, and a chain guide, typically embodied as a so-called chain cage, to which the movable element is coupled so as to be rotatable in terms of a rotation axis. The movable element is movable in the lateral (axial) direction so as to move the chain guide along the sprockets of the sprocket set such that the chain can be transferred from an initial sprocket to a target sprocket. The chain guide by a tension spring or the like is elastically pretensioned in a rotating direction, specifically in the direction of a tension of the chain of the bicycle guided by the chain guide, so as to keep the chain in the tensioned state, or to restore the tensioned state after the previous state of insufficient chain tension, respectively. This rotating or pivoting direction here is also referred to as the "chain tensioning direction". A rotation of the chain guide in this direction increases the chain tension and simultaneously reduces the tension of the tension spring acting on the chain guide.

Depending on the current sprocket of the sprocket set in which the chain engages at a given point in time, the chain guide in terms of the rotation axis will assume different pivoted positions relative to the movable element.

Influences on the chain and the chain guide are derived not only from shifting the chain shift mechanism by transferring the chain between different sprockets of the sprocket set, but also from the cycling operation per se. For instance, the rear derailleur and the chain are subject to impacts and shocks when running on uneven ground, said impacts and shocks potentially acting in a pivoting direction counter to a "chain-tensioning direction" on the chain guide. A rotation of the chain guide in this direction, counter to the "chain-tensioning direction" increases the tension of the tension spring acting on the chain guide, and leads directly to the chain tension being reduced (for instance when a direct action on the chain guide rotates the latter in this direction) or at least leads to a significant risk of the chain tension being subsequently reduced below the required level. Negative consequences can be tension losses in the chain associated with undesirable play or slack in the chain, respectively, or the chain jumping from the sprocket set in an extreme case.

In the case of the rear derailleur being fixed in a friction-fitting manner on the bicycle frame in terms of the envisaged angular position of the derailleur, specifically of the angular position in terms of the forward or reverse direction of the bicycle, or in the "chain-tensioning direction" or counter to the "chain-tensioning direction", impacts exerted on the rear derailleur, for example on uneven terrain or by branches or the like projecting in the cycle path, or in the event of crashes, can lead to an undesirable adjustment of the angular position of the rear derailleur, this however typically being preferable in comparison to the risk of damage to the derailleur by such impact in the case of the rear derailleur being fixed in the form-fitting manner in terms of this angular position.

A correct positioning and alignment, especially of the rear derailleur on the frame of the bicycle, is also of great importance for a good performance of such a chain shift mechanism. It has been recognized that coaxial alignment features can be applied in the disposal of the drive. For example, one single component can serve as a reference for the alignment of various other components of the drive assembly. For example, a derailleur as well as a cassette can be aligned or assembled, respectively, so as to be coaxial with an axis. The alignment of a component of the drive train, such as the derailleur, in relation to this axis can reduce the inaccuracies by virtue of variations in the tolerances of the wheels or of the frame in various applications. The alignment of the derailleur so as to be coaxial with the wheel axis or the cassette, respectively, can also facilitate a uniform radial spacing between parts of the derailleur and the cassette across different pivot angles of the derailleur.

The drive assembly can also be configured with a view to stiffness in order to improve the precision or/and improve the relative alignment of components. For example, relevant components and elements of the rear derailleur, of the rear axle assembly with the rear wheel hub and the sprocket cassette of the rear road wheel, and the frame interfaces of the rear tail of the bicycle frame assigned to the former, can be mutually configured such that the derailleur is positioned and assembled on the frame in a reliable and correct manner, and so as to be dependent on tolerances to an at most harmless extent, relative to the sprocket cassette and the chain running over the latter, and a positive stiffness is achieved at the same time such that this correct positioning is maintained during the cycling operation despite potentially considerable and changing stresses that arise depending on the hard ground on which cycling takes place.

A correspondingly mutually tuned configuration of the so-called B knuckle (or base element) of a rear derailleur, thus that sub-component of a rear derailleur that is assembled on an assigned frame interface, of the rear tail of the bicycle frame, and especially of those frame interfaces on which the rear axle assembly of the rear road wheel and the rear derailleur are assembled, and of the rear axle assembly is thus possible in order to meet the requirements among the mentioned targets of correct positioning and alignment, precision and stiffness.

REFERENCES

Conventionally, rear derailleurs have been assembled on the rear drop out of the frame rear tail with the aid of a derailleur hanger that is separate from the frame rear tail or associated with the frame rear tail, specifically so as to be offset in the radial direction in relation to the rear axle and thus so as not to be coaxial with the rear axle. The derailleur hanger, also known as a "hanger", at the one end thereof to this end is established on the frame rear tail so as to be coaxial with the rear wheel axis, and at the other end thereof is connected to the base element (B knuckle) of the derailleur. The base element is rotatable about the B axis relative to the derailleur hanger.

With a view to various disadvantages of such an assembly of the rear derailleur on the frame by a derailleur hanger, the applicant SRAM Deutschland GmbH has developed a new type of rear derailleur for the coaxial assembly—in terms of the rear wheel axis—on a frame rear tail of a correspondingly designed bicycle frame, pending patent applications being focused on said new type of rear derailleur. The bicycle frame has, on the frame rear tail, a special interface for the rear derailleur, said interface with the participation of a frame adapter of the rear derailleur simultaneously acting as the frame interface for the rear axle assembly on the one axial frame side. Furthermore, this frame interface including the base element (B knuckle) and the frame adapter and the frame interface on the other axial frame side for the rear axle assembly, on the one hand, and the rear axle assembly, on the other hand, are for the first time mutually configured so as to be particularly suitable in this new type of rear derailleur. As a result, not only are the various disadvantages of the use of a conventional derailleur hanger overcome, but a sufficient or even very positive stiffness of the disposal of the derailleur on the frame interface thereof can moreover be achieved. The objectives in terms of the correct positioning, alignment and precision mentioned at the outset can be reliably met.

Reference in this respect is made to the German patent application Az. 10 2018 001 253.1, published as DE 10 2018 001 253 A1 (DE'253 for short); to the European patent application Az. 18 000 255.2, published as EP 3 388 324 A2; to the Taiwanese patent application Az. 107 107 712, published as TW 2018 34 921 A; to the Chinese patent application Az. 2018 1021 7966.9, published as CN 10 8622 302 A; and to the US application Az. Ser. No. 15/926,194, published as US 2018/0265169 A1, filed by SRAM Deutschland GmbH. The disclosure of these applications is fully incorporated in the disclosure of the present patent application by reference.

A rear derailleur—in terms of a rear wheel axis—for the coaxial attachment on a bicycle frame rear tail of a bicycle is known from these publications. The known derailleur has a base element, a pivoting mechanism, a movable element and a chain guide assembly. The pivoting mechanism connects the base element to the movable element and the chain guide assembly, the latter by a force-accumulating assembly being pretensioned, or able to be pretensioned, in a chain-tensioning direction, is connected to the movable element so as to be rotatable about a rotation axis. The base element comprises a first connecting end for the coaxial attachment—in terms of the rear wheel axis—on the bicycle frame rear tail, and a second connecting end for coupling to the pivoting mechanism. The first connecting end has a first arm and a second arm which in the axial direction are disposed so as to be mutually spaced apart and, by an associated adapter, are specified for assembling the derailleur on an assigned mounting portion (in particular the dropout or a frame hanger) of a rear tail of the bicycle frame).

In a defined preassembled state and in a completely assembled state, the first arm is situated on an axial internal side of the mounting portion and the second arm is situated on an axial external side of the mounting portion. The adapter comprises an adapter bolt and an associated adapter nut that is able to be screwed to the adapter bolt. In the defined pre-assembled state and in the completely assembled state, a bolt head of the adapter bolt is disposed on the axial external side of the mounting portion, and the adapter nut that is screwed so as to engage with the adapter bolt is disposed on the axial internal side of the mounting portion.

In the defined pre-assembled state, a rotational force is able to be exerted on the adapter nut by rotating the adapter bolt in a tightening direction, a consequential rotational force based on said rotational force by way of at least one entrainment formation of the adapter nut and at least one associated mating entrainment formation of the base element being able to be exerted on the base element which in the defined pre-assembled state is rotatable relative to the mounting portion in a first rotating direction corresponding to the tightening direction. This consequential rotational force acts counter to counter rotational force exerted on the base element and, with the facilitation of a bicycle chain of the bicycle chain shift mechanism guided by the chain guide assembly, is exerted on the base element in a second direction counter to the first rotating direction. The first rotating direction corresponds to the previously mentioned "chain-tensioning direction".

In the completely assembled state, the bolt head and the adapter nut are braced with the mounting portion by axial thread forces. The adapter nut on an axial side that faces the mounting portion is embodied with a knurled face which, in the completely assembled state, engages with an assigned contact face on the axial internal side of the mounting portion. The base element, in the completely assembled state, on a clamping portion of the first on thereof, between the adapter and a stator module of a rear axle assembly associated with a rear road wheel of the bicycle, is axially clamped and fixed in a friction-fitting manner against rotation.

Such a rear derailleur is also known from publications DE 10 2018 206 104 A1 (DE'104 for short), EP 3 556 643 A1, CN 11 0386 220 A, TW 2019 45 244 A, and US 2019/

0322333 A1, the disclosure thereof being likewise completely incorporated in the disclosure of the present patent application by reference. Refinements and alternative solutions to this rear derailleur are described in publications DE 10 2020 201 229 A1, EP 3 712 052 A1, CN 11 1720 506 A, TW 2020 39 303 A, and US 2020/0298933 A1, as well as in publications DE 10 2020 132 208 A1 (DE'208 for short), EP 3 838 731 A2, CN 11 3002 690 A, TW 2021 24 213 A, and US 2021/0188396 A1

The frame interface of a bicycle frame rear tail embodied for the coaxial attachment of such a rear derailleur can at the same time be advantageously suitable for a conventional derailleur to be alternatively assembled thereon so as not to be coaxial with the respective frame hanger, as is derived from DE'104 and DE'208, for instance. This assembly takes place by an adapted mounting element which is typically referred to as a "derailleur hanger" or "hanger" but is to be distinguished from conventional derailleur hangers as alluded to above.

Explicit reference is also made hereunder to publication DE 10 2018 001 253 A1, also referred to as DE'253 for short, the former also being representative for the two patent families corresponding to DE'253 and DE'104 mentioned. The description of the disclosure hereunder in terms of the various aspects and of the exemplary embodiments visualizing the former uses the definitions, contexts and terminology used in publication DE'253, and the content of this publication is explicitly a component part of the present description of the disclosure not only in terms of the definitions and technical contexts used in DE'253.

According to DE'253, a frame adapter 60 is used for assembling the derailleur 10, as can be seen in detail from FIGS. 5 to 8 therein. The frame adapter 60 is screwed to a right dropout, or frame hanger, respectively, of the rear tail of a bicycle frame such that the knurled nut, or adapter nut 66 (therein also referred to as a knurled disc or detent disc, respectively) associated with the frame adapter 60, by the knurled link on the end side thereof, is imparted a defined rotational angular position relative to the frame hanger as a result of bearing in a form-fitting or friction-fitting manner on the internal side of the right frame hanger.

As a result of the base element (so-called B knuckle) of the derailleur impacting on rotational detent protrusions 68*a/b* of the adapter nut 66 (cf. FIG. 8 of DE'253), a corresponding rotational pivoted position of the derailleur 10 in terms of the bicycle rear axle, or the dropout, respectively, can be set and fixed by this defined rotational angular position of the adapter nut 66. As a result, the bicycle chain is imparted the chain tension desired, or required for the optimal shifting function, respectively, by the torsion spring that in the usual manner is situated between the element movable by shifting (so-called P knuckle 40; cf. FIG. 3 of DE'253) and the chain guide assembly (so-called chain cage 50; cf. FIG. 3 of DE'253).

A sequence of this adjustment procedure for establishing the desired chain tension, or the so-called chain gap (spacing between the upper chain guide roller and the reference sprocket) required to this end, respectively, in DE'253 is described in detail in paragraph [0090] with reference to FIGS. 10 to 12 therein.

A bicycle shifting mechanism having an adjustment mark that indicates a rotational angle between a P knuckle module and a cage element module is known from DE 10 2020 210 354 A1, published 25 Feb. 2021. This publication also contains information pertaining to the correct adjustment of a so-called chain gap of a bicycle drive train. Reference to this end can also be made by citing the corresponding publications EP 3 782 891 A1, CN 11 2407 136 A, and US 2021/0054929 A1.

SUMMARY

According to one aspect, a rear derailleur of a bicycle chain shift mechanism for the coaxial attachment—in terms of a rear axis on a bicycle frame rear tail of a bicycle, includes: a base element; a pivoting mechanism; a movable element; and a chain guide assembly.

The pivoting mechanism connects the base element to the movable element, and the chain guide assembly, the latter by a force-accumulating assembly being pretensioned, or able to be pretensioned, in a chain-tensioning direction, being connected to the movable element to be rotatable about a rotation axis. The base element includes a first connecting end for the coaxial attachment—in terms of the rear axis—on the bicycle frame rear tail, and a second connecting end for coupling to the pivoting mechanism.

The first connecting end has a first arm and a second arm which in the axial direction are disposed to be mutually spaced apart and, by an associated adapter, are specified for assembling the derailleur on an assigned mounting portion of a rear tail of the bicycle frame rear tail. In a defined pre-assembled state and in a completely assembled state, the first arm is situated on an axial internal side of the mounting portion and the second arm is situated on an axial external side of the mounting portion.

The adapter includes an adapter bolt and an associated adapter nut that is able to be screwed to the adapter bolt and, in the defined pre-assembled state and in the completely assembled state, a bolt head of the adapter bolt is disposed on the axial external side of the mounting portion, and the adapter nut that is screwed to engage with the adapter bolt is disposed on the axial internal side of the mounting portion; and in the defined pre-assembled state, a rotational force is able to be exerted on the adapter nut by rotating the adapter bolt in a tightening direction, a consequential rotational force based on said rotational force by way of at least one entrainment formation of the adapter nut and at least one associated mating entrainment formation of the base element being able to be exerted on the base element which in the defined pre-assembled state is rotatable relative to the mounting portion in a first rotating direction corresponding to the tightening direction, said consequential rotational force acting counter to a counter rotational force exerted on the base element and, with the facilitation of a bicycle chain of the bicycle chain shift mechanism guided by the chain guide assembly, being exerted on the base element in a second direction counter to the first rotating direction.

At least one engagement element which facilitates an indirect frictional engagement between the adapter nut, on the one hand, and at least one of a) the first arm of the base element, b) the axial internal side of the mounting portion and c) the adapter bolt, on the other hand, said engagement element acting in the sense of a reinforcement of the consequential rotational force being able to be exerted on the base element.

BRIEF DESCRIPTION OF DRAWINGS

Other aspects and advantages of the embodiments disclosed herein will become apparent upon consideration of the following detailed description, wherein similar or identical structures have similar reference numerals.

DETAILED DESCRIPTION

Figure 1:
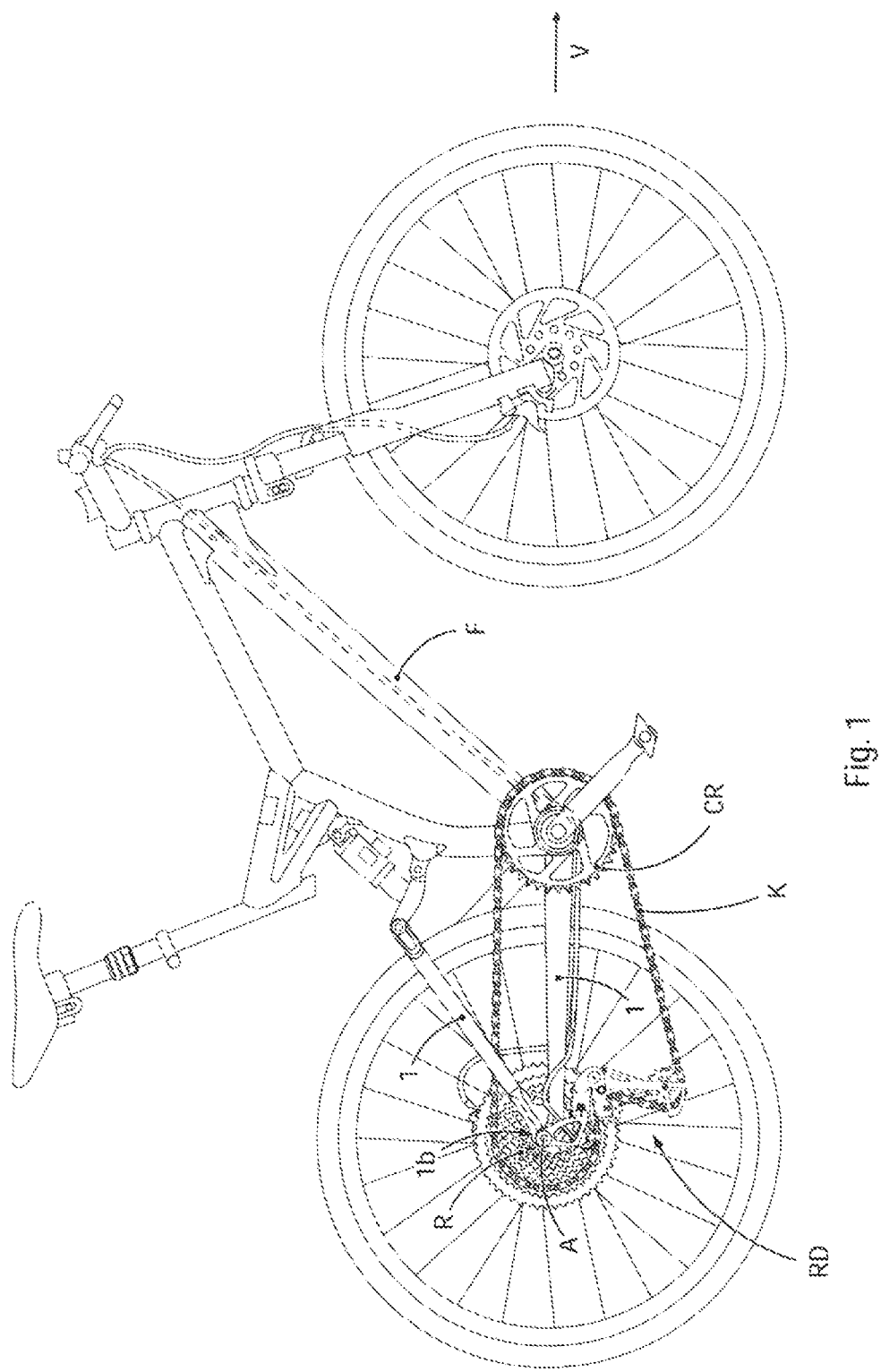
FIG. 1 shows an exemplary bicycle having a rear derailleur according to the disclosure of a chain shift mechanism of the bicycle, said rear derailleur being assembled on a rear frame hanger of the rear tail of the bicycle frame so as to be coaxial with a rotation axis of the rear road wheel of the bicycle.

Against this technical background, the present disclosure generally relates to a rear derailleur of a bicycle chain shift mechanism, and to the manner of assembling the rear derailleur in relation to a rear wheel axis on a bicycle frame, and thus also to a suitable frame interface for the bicycle frame of a corresponding bicycle that has the rear shift unit.

Various embodiments of the invention will be described herein with reference to the drawings. It will be understood that the drawings and the description set out herein are provided for illustration only and do not limit the invention as defined by the claims appended hereto and any and all their equivalents. For example, the terms "first" and "second", "front" and "rear", "left" and "right" are used for the sake of clarity and not as terms of limitation. Moreover, the terms referred to bicycle mechanisms conventionally mounted to a bicycle and with the bicycle orientated and used in a standard fashion unless otherwise indicated.

The present disclosure provides alternative solutions and refinements to the known solutions for attaching a bicycle derailleur to the right frame hanger or the dropout of a bicycle frame rear tail so as to be coaxial with the rear axis, various advantages being derived from said alternative solutions and refinements.

It is an object of the present disclosure to guarantee an adjustment capability of a base element of a rear derailleur on the bicycle frame.

It is a further object of the present disclosure to achieve a high holding element between components important for the assembly on the frame, including the frame.

It is a further object of the present disclosure to meet different requirements by way of alternative design embodiments of at least one of the components important for the assembly on the frame.

It is a further object of the present disclosure to make any malposition of the rear derailleur on the bicycle frame easily identifiable.

In order for at least one of the mentioned objects to be achieved, the disclosure according to a first aspect provides the following subject matter:

a rear derailleur of a bicycle chain shift mechanism for the coaxial attachment—in terms of a rear axis—on a bicycle frame rear tail of a bicycle, said rear derailleur having: a base element; a pivoting mechanism; a movable element; and a chain guide assembly;

where the pivoting mechanism connects the base element to the movable element and the chain guide assembly, the latter by a force-accumulating assembly being pretensioned, or able to be pretensioned, in a chain-tensioning direction, being connected to the movable element so as to be rotatable about a rotation axis;

where the base element includes a first connecting end for the coaxial attachment—in terms of the rear axis—on the bicycle frame rear tail and a second connecting end for coupling to the pivoting mechanism;

where the first connecting end has a first arm and a second arm which in the axial direction are disposed so as to be mutually spaced apart and, by an associated adapter, are specified for assembling the derailleur on an assigned mounting portion of a rear tail of the bicycle frame;

where, in a defined preassembled state and in a completely assembled state, the first arm is situated on an axial internal side of the mounting portion and the second arm is situated on an axial external side of the mounting portion;

where the adapter includes an adapter bolt and an associated adapter nut that is able to be screwed to the adapter bolt and, in the defined preassembled state and in the completely assembled state, a bolt head of the adapter bolt is disposed on the axial external side of the mounting portion, and the adapter nut that is screwed so as to engage with the adapter bolt is disposed on the axial internal side of the mounting portion; and where, in the defined preassembled state, a rotational force is able to be exerted on the adapter nut by rotating the adapter bolt in a tightening direction, a consequential rotational force based on said rotational force by way of at least one entrainment formation of the adapter nut and at least one assigned mating entrainment formation of the base element being able to be exerted on the base element which in the defined pre-assembled state is rotatable relative to the mounting portion in a first rotating direction corresponding to the tightening direction, said consequential rotational force acting counter to a counter rotational force exerted on the base element and, with the facilitation of a bicycle chain of the bicycle chain shift mechanism guided by the chain guide assembly, being exerted on the base element in a second direction counter to the first rotating direction.

According to the disclosure, this subject matter is characterized by at least one engagement element which facilitates an indirect frictional engagement between the adapter nut, on the one hand, and at least one of a) the first arm of the base element, b) the axial internal side of the mounting portion and c) the adapter bolt, on the other hand, said engagement element acting in the sense of a reinforcement of the consequential rotational force being able to be exerted on the base element.

As a refinement it is proposed that at least one engagement element which is embodied and disposed so as to facilitate an indirect frictional engagement between the adapter nut on the one hand, and the adapter bolt, on the other hand and, in the defined pre-assembled state, acts as in the sense of a reinforcement of the rotational force being able to be exerted on the adapter nut, is provided.

Additionally or alternatively, it is furthermore proposed that at least one engagement element which is embodied and disposed so as to facilitate an indirect frictional engagement between the adapter nut, on the one hand, and at least one of a) the first arm of the base element and b) the axial internal side of the mounting portion, on the other hand, and, in the defined pre-assembled state, in the sense of a reinforcement of the consequential rotational force influences a momentary ratio between an original rotational force which is exerted on the adapter bolt in the tightening direction and rotates the latter relative to the mounting portion and the resulting consequential rotational force, is provided.

It can be provided that, in the defined pre-assembled state, the rotational force is able to be exerted on the adapter nut by rotating the adapter bolt, so as to first bring said adapter nut by way of the entrainment formation thereof to engage in an entraining manner with the entrainment formation of the base element, and to then exert the consequential rotational force on the base element so as to rotate the latter in the first rotating direction, the latter corresponding to the tightening direction.

One preferred embodiment is distinguished by at least one engagement element which is embodied so as to facilitate an indirect frictional engagement and, in the defined pre-assembled state, is clamped between the adapter nut and the adapter bolt and couples in a friction-fitting manner the adapter nut to the adapter bolt so as to provide a friction-fitting rotational entrainment of the adapter nut by the adapter bolt.

It can be expediently provided here that the engagement element is embodied as an annular element which is preferably produced from plastics material and, in the defined pre-assembled state, is clamped between an internal circumference of the adapter nut and an external circumference of the adapter bolt.

As a refinement it is proposed that the annular element received in an annular groove on the internal circumference of the adapter nut is elastically deformed, or deformable, or plastically deformed, or deformable, or elastically and plastically deformed, or deformable, by introducing and screwing the adapter bolt into the adapter nut so as to establish the defined pre-assembled state in order for said annular element in the defined pre-assembled state to be clamped in a radial manner between a base of the annular groove and the external circumference of the adapter bolt and, optionally, in an axial manner between axial delimitation faces of the annular groove.

The or a preferred embodiment is (furthermore) distinguished by at least one engagement element which is embodied so as to facilitate an indirect frictional engagement and, in the defined pre-assembled state, provides a friction bearing that is assigned to the first arm of the base element and to the adapter nut and reduces friction arising between the first arm of the base element and the adapter nut, so as to reduce counter forces acting counter to a rotation of the adapter nut in the first rotating direction.

It can be provided here that the at least one engagement element provides at least one of a radial friction bearing and an axial friction bearing.

It can furthermore expediently be provided that, in the defined pre-assembled state, at least one annular element produced from a friction bearing material is disposed between an external side of the first arm of the base element and an internal side of the adapter nut in order for the friction bearing to be provided.

As a refinement it is proposed that the annular element, in the defined pre-assembled state, in axial terms is disposed between mutually facing surface portions of the first arm of the base element and the adapter nut, said surface portions preferably being of opposite axial orientations.

An expedient design embodiment is distinguished in that the annular element, in the defined pre-assembled state, in radial terms is disposed between a surface portion of the first arm of the base element that forms an internal circumferential region and a surface portion of the adapter nut that forms an external circumferential region, where the external circumferential region of the adapter nut and the internal circumferential region of the first arm of the base element axially overlap at least in portions.

It can advantageously also be provided that the annular element on a radial interference-fit side engages, or is able to be brought to engage, by way of an interference fit with one of the assigned internal circumferential region and the external circumferential region, and a radial clearance-fit side of the annular element is assigned to the respective other one of the internal circumferential region and the external circumferential region, where a clearance fit for the annular element is provided on the respective other assigned one of the internal circumferential region and the external circumferential region.

As a refinement it is proposed that the clearance-fit side of the annular element is embodied with at least one holding formation, and the assigned other one of the internal circumferential region and the external circumferential region, preferably the external circumferential region of the adapter nut, is embodied with at least one mating holding formation, where the holding formation and the mating holding formation, in the defined pre-assembled state, engage in a form-fitting manner, or are able to be brought to engage in a form-fitting manner, such that the adapter nut, in the defined pre-assembled state, by the annular element is retained on the external side of the first arm of the base element.

To this end, it is furthermore conceivable that one of the holding formation and the mating holding formation is embodied at least so as to radially project, optionally embodied as a radially projecting annular bead, and in the defined pre-assembled state radially overlaps the other of the holding formation and the mating holding formation, where for retaining the adapter nut on the external side of the first arm of the base element, one of the holding formation and the mating holding formation is preferably able to be elastically snap-fitted, or is snap-fitted, in the respective other one, or behind the respective other one.

It is furthermore proposed that, in the state of the adapter nut by the annular element being retained on the external side of the first arm of the base element, an axial clearance is provided between the holding formation and the mating holding formation, said axial clearance in the defined pre-assembled state being able to be absorbed by rotating the adapter bolt in the tightening direction.

As a refinement is can furthermore be provided here that, by rotating the adapter bolt in the tightening direction, the adapter nut by way of a contact face, preferably embodied as a knurled face, is able to be moved close to an assigned contact face on the axial internal side of the mounting portion and able to be brought to bear on the latter, where by rotating the adapter bolt in the tightening direction, the axial clearance between the holding formation and the mating holding formation is preferably able to be absorbed first before the contact face of the adapter nut comes to bear in an engaging manner on the assigned contact face of the mounting portion.

Additional advantages can be achieved when, upon establishing the bearing engagement, by rotating the adapter bolt further in the tightening direction, an axial tensile force is able to be exerted on the annular element by way of the mutual form-fitting engagement of the holder information and the counter holder information, and the annular element as a result of this axial tensile force is able to be extracted by a defined axial distance from the press-fit with the assigned one of the internal circumferential region and the external circumferential region.

It is furthermore conceivable that the preferred embodiment, or an alternative embodiment, is distinguished by at least one engagement element which is embodied so as to facilitate an indirect frictional engagement and is held on the adapter nut and serves as an axial spacer element and is assigned to a contact face of the adapter nut and to a contact face of the axially inner side of the mounting portion, said contact faces preferably being embodied as a knurled face, and, in the defined pre-assembled state, acting as an effective spacer element between said contact faces and keeping the contact face of the adapter nut and the contact face of the mounting portion so as to be axially spaced apart when the adapter bolt in the tightening direction is rotated beyond a provided angular rotating range of the adapter bolt and before the contact face of the adapter nut comes to bear in an engaging manner with the assigned contact face of the mounting portion when the adapter bolt is further rotated in the tightening direction.

As a refinement it is proposed that, in the defined pre-assembled state, the adapter nut by way of the contact face thereof is able to be moved closer to the assigned bearing face of the mounting portion by rotating the adapter bolt in the tightening direction, said movement being counter to a surmountable counterforce of the spacer element that engages on the contact face of the mounting portion and ensures an indirect friction between these contact faces that is reduced in comparison to a direct engagement between these contact faces and is preferably elastically or plastically or elastically and plastically deformable.

It can be advantageously seen here that the spacer element is embodied as a spring element that is able to be tensioned at least in the axial direction, for example as a steel spring.

It is conceivable that the spacer element is held in a groove, preferably in an annular groove or a groove in the shape of a circular segment, in the contact face of the adapter nut, and in the course of the mutually assigned contact faces of the adapter nut and of the mounting portion converging by rotating the adapter bolt in the tightening direction, at least one portion of the spacer element that projects from the groove is able to be displaced by the contact face of the mounting portion from an axial intermediate region between the two contact faces into the groove.

It is generally furthermore proposed that an external flanged portion of the adapter nut forms the entrainment formation of the adapter nut, and a protrusion of the base element forms the mating entrainment formation, said protrusion from an external side of the first arm projecting axially in the direction towards the second arm and optionally being embodied as a separate detent bolt.

In the completely assembled state, the bolt head and the adapter nut will typically be braced with the mounting portion by axial thread forces. The adapter nut on an axial side that faces the mounting portion can expediently be embodied with a/the knurled face which, in the completely assembled state, engages with an assigned contact face on the axial internal side of the mounting portion.

In order for at least one of the mentioned tasks to be solved it is furthermore proposed to this end that the adapter nut is embodied with an external flange which on an axial side that faces the mounting portion has a knurling that forms the knurled face or enlarges the latter in the radial direction, where the external flange in the completely assembled state extends into an axial gap between the first arm of the base element and the axial internal side of the mounting portion.

This proposed refinement is also of interest independently of the disclosure according to the first aspect.

Accordingly, the disclosure according to an independent second aspect provides the following subject matter:

a rear derailleur of a bicycle chain shift mechanism for the coaxial attachment—in terms of a rear axis—on a bicycle frame rear tail of a bicycle, said rear derailleur having: a base element; a pivoting mechanism; a movable element; and a chain guide assembly;

where the pivoting mechanism connects the base element to the movable element and the chain guide assembly, the latter by a force-accumulating assembly being pretensioned, or able to be pretensioned, in a chain-tensioning direction, being connected to the movable element so as to be rotatable about a rotation axis;

where the base element includes a first connecting end for the coaxial attachment—in terms of the rear axis—on the bicycle frame rear tail and a second connecting end for coupling to the pivoting mechanism;

where the first connecting end has a first arm and a second arm which in the axial direction are disposed so as to be mutually spaced apart and, by an associated adapter, are specified for assembling the derailleur on an assigned mounting portion of a rear tail of the bicycle frame;

where, at least in a completely assembled state, the first arm is situated on an axial internal side of the mounting portion and the second arm is situated on an axial external side of the mounting portion;

where the adapter includes an adapter bolt and an associated adapter nut that is able to be screwed to the adapter bolt and, in the completely assembled state, a bolt head of the adapter bolt is disposed on the axial external side of the mounting portion, and the adapter nut that is screwed so as to engage with the adapter bolt is disposed on the axial internal side of the mounting portion and the bolt head and the adapter nut are braced by axial threaded forces to the mounting portion; and where the adapter nut on an axial side that faces the mounting portion is embodied with a knurled face which, in the completely assembled state, engages with an assigned contact face on the axial internal side of the mounting portion.

According to the disclosure, this subject matter is characterized in that the adapter nut is embodied with an external flange which on an axial side that faces the mounting portion has a knurling that forms the knurled face or enlarges the latter in the radial direction, where the external flange in the completely assembled state extends into an axial gap between the first arm of the base element and the axial internal side of the mounting portion.

As a refinement it is proposed that the external flange is embodied as an annular flange that in an annular manner extends about a central region of the adapter nut which has a screw opening for the adapter bolt and, on the axial side of said external flange that faces the mounting portion, has a knurling extending in an annular manner.

It is particularly preferably proposed that the external flange forms a front detent for an assigned counter detent of the base element so as to, in the completely assembled state, support in a form-fitting manner on the adapter nut, the latter being tightly tensioned on the mounting portion, forces that act on the base element in a forward direction.

It can advantageously be provided here that the front detent is formed by a radially projecting flanged region of the external flange that extends as an annular flange in an annular manner about the central region of the adapter nut that has a screw opening for the adapter bolt.

As a refinement that is particularly advantageous for many applications, it is furthermore proposed that the external flange forms a rear detent for an assigned counter detent of the base element so as to, in the defined pre-assembled state in which the adapter is not yet tightly tensioned, or in a state that corresponds to the pre-assembled state and in which the previously tightly tensioned adapter has been loosened, to limit a pivoting angle of the base element relative to the mounting portion in a rearward direction.

It can advantageously be provided here that the rear detent is formed by a radially projecting flanged region of the external flange as an annular flange that extends in an annular manner about the central region of the adapter nut that has a screw opening for the adapter bolt.

In this context, it is generally proposed that at least one flanged region projects radially from an inner annular flanged region of the adapter nut and serves as a detent for interacting with at least one counter detent of the base element, where the annular flanged region is embodied with the annular extending knurling that forms the knurled face or enlarges the latter in the radial direction, and the flanged region serving as the detent is embodied without any knurling.

In terms of the base element it is conceivable in this context that at least one protrusion of the base element that from an external side of the first arm projects axially in the direction toward the second arm, and is optionally embodied as a separate detent bolt, and serves as a counter detent for interacting with at least one detent of the adapter nut is provided.

Reference is made to the proposals pertaining to the disclosure and refinements thereof according to the first and the second aspect.

The base element, in the completely assembled state, on a clamping portion of the first arm thereof, between the adapter and a stator module of a rear axle assembly associated with a rear road wheel of the bicycle, can advantageously be axially clamped and fixed in a friction-fitting manner against rotation.

As a refinement for solving at least one of the mentioned tasks it is proposed to this end that a verification mark that permits at least one of a momentarily existing nominal angular positioning of the base element and a momentarily existing erroneous angular positioning, deviating from the nominal angular positioning, relative to at least one of the adapter nut, the mounting portion and the stator module to be identified, is provided.

This proposed refinement is also of interest independently from the disclosure according to the first aspect and independently of the second aspect.

Accordingly, the disclosure according to an independent third aspect provides the following subject matter:

a rear derailleur of a bicycle chain shift mechanism for the coaxial attachment—in terms of a rear axis—on a bicycle frame rear tail of a bicycle, said rear derailleur having: a base element; a pivoting mechanism; a movable element; and a chain guide assembly;

where the pivoting mechanism connects the base element to the movable element and the chain guide assembly, the latter by a force-accumulating assembly being pretensioned, or able to be pretensioned, in a chain-tensioning direction, being connected to the movable element so as to be rotatable about a rotation axis;

where the base element includes a first connecting end for the coaxial attachment—in terms of the rear axis—on the bicycle frame rear tail and a second connecting end for coupling to the pivoting mechanism;

where the first connecting end has a first arm and a second arm which in the axial direction are disposed so as to be mutually spaced apart and, by an associated adapter, are specified for assembling the derailleur on an assigned mounting portion of a rear tail of the bicycle frame;

where, at least in a completely assembled state, the first arm is situated on an axial internal side of the mounting portion and the second arm is situated on an axial external side of the mounting portion;

where the adapter includes an adapter bolt and an associated adapter nut that is able to be screwed to the adapter bolt and, in the completely assembled state, a bolt head of the adapter bolt is disposed on the axial external side of the mounting portion, and the adapter nut that is screwed so as to engage with the adapter bolt is disposed on the axial internal side of the mounting portion and the bolt head and the adapter nut are braced by axial threaded forces to the mounting portion; and the base element, in the completely assembled state, on a clamping portion of the first arm thereof, between the adapter and a stator module of a rear axle assembly associated with a rear road wheel of the bicycle, is axially clamped and fixed in a friction-fitting manner against rotation.

According to the disclosure, this subject matter is characterized by a verification mark that permits at least one of a momentarily existing nominal angular positioning of the base element and a momentarily existing erroneous angular positioning, deviating from the nominal angular positioning, relative to at least one of the adaptor nut, the mounting portion and the stator module to be identified.

It can be advantageously provided that the verification mark has a first display element on a separate component that is at a fixed relative angular position relative to the base element, or preferably on the base element.

It is furthermore proposed to this end that the verification mark has a second display element on one of the adapter nut, the mounting portion and the stator module, or on a component that is at a fixed relative angular position relative to one of the adapter nut, the mounting portion and the stator module.

According to a particularly preferred design embodiment it is proposed that the second display element is provided on a component that is at a fixed relative angular position relative to the adapter nut, or preferably on the adapter nut.

It is conceivable that the first display element and the second display element are in mutual alignment when the momentary angular positioning of the base element corresponds to the nominal angular positioning.

It can be expediently provided that the nominal angular positioning of the base element corresponds to an angular detent position of the base element relative to the adapter nut, where the angular detent position of the base element is defined by a mutual detent or by a detent, preferably a front detent, of the adapter nut and an assigned counter detent of the base element bearing on one another.

In terms of all aspects of the disclosure it is proposed as a refinement in general that the rear derailleur is embodied with a bearing element assembly which is assigned to at least two elements of the adapter bolt, the second arm of the base element and the mounting portion, so as to facilitate mutual mounting.

It is particularly expediently conceivable here that the bearing element assembly includes at least one of a bearing bush assigned to a shank portion of the adapter bolt and an internal circumference of an assembly opening of the mounting portion, a bearing collar or bearing ring assigned to an external side of the mounting portion and the second arm of the base element, and a bearing bush assigned to the bolt head of the adapter bolt and to the second arm of the base element, or a bearing ring assigned thereto, thus to the bolt head of the adapter bolt and to the second arm of the base element.

The disclosure furthermore also provides a bicycle, including a bicycle frame having a frame rear tail, a rear road wheel and a chain shift mechanism having a rear derailleur, where the bicycle furthermore has the following features:

the rear road wheel is embodied with a stator assembly including a rear axle assembly and a rotor assembly, where the rotor assembly is mounted so as to be rotatable relative to the stator assembly and includes a road wheel hub having a driver that supports a sprocket pack of the chain shift mechanism;

the rear tail of the bicycle frame has a left mounting portion and a right mounting portion for an internal axle of the rear wheel assembly of the rear road wheel, said left mounting portion and said right mounting portion along a geometric axis having a predetermined defined axial spacing from the internal axle mounted on the frame rear tail by the mounting portions, and forming in each case a counter bearing for a component group that is disposed on the internal axle, clamped between the mounting portions and including a module of the stator assembly;

the rear derailleur in terms of the geometric axis is mounted so as to be coaxial on the bicycle frame rear tail and includes: a base element; a pivoting mechanism; a movable element; and a chain guide assembly;

where the pivoting mechanism connects the base element to the movable element and the chain guide assembly, the latter by a force-accumulating assembly being pretensioned, or able to be pretensioned, in a chain-tensioning direction, being connected to the movable element so as to be rotatable about a rotation axis;

where the base element includes a first connecting end for the coaxial attachment—in terms of the geometric axis—on the bicycle frame rear tail and a second connecting end for coupling to the pivoting mechanism;

where the first connecting end has a first arm and a second arm which in the axial direction are disposed so as to be mutually spaced apart and, by an associated adapter, are specified for assembling the derailleur on the assigned right mounting portion of the frame rear tail, where the adapter includes an adapter bolt and an associated adapter nut that is able to be screwed to the adapter bolt;

where the first arm is situated on an axial internal side of the assigned mounting portion and the second arm is situated on an axial external side of the assigned mounting portion; and where a bolt head of the adapter bolt is disposed on the axial external side of the mounting portion, and the adapter nut that is screwed so as to engage with the adapter bolt is disposed on the axial internal side of the mounting portion.

According to the disclosure, the rear derailleur is embodied as a rear derailleur according to the disclosure and according to at least one of the three independent aspects of the disclosure, optionally while implementing one or a plurality of proposed refinements thereto. The rear derailleur can be completely assembled on the bicycle frame.

It is conceivable here that the right mounting portion, assigned to the rear derailleur, has a front detent for a detent formation of the adapter nut of the adapter.

It is furthermore conceivable to this end that, in the completely assembled state of the rear derailleur on the bicycle frame rear tail, a rotational angular spacing exists between the front detent of the mounting portion and the detent formation of the adapter nut, said rotational angular spacing preferably being 3 to 15 degrees and most preferably being 7 to 9 degrees.

FIG. 1 in an exemplary manner shows a bicycle having a bicycle drive which is customary per se. The bicycle drive includes a front chain wheel CR, a rear sprocket pack R and a chain K which by the rear derailleur RD can be moved from one sprocket to the next. The directional indications right/left and front/rear used hereunder refer to a bicycle in the travel direction V, thus correspond to the perspective of a cyclist on the bicycle. The bicycle frame F typically has a left and a right rear dropout or frame hanger on the frame rear tail, the rear wheel being assembled therebetween. The rear wheel conjointly with the sprocket pack R rotates about the rear wheel axis A. Axial refers to the rear wheel axis A, or the rotation axis A of the multiple sprocket assembly R, respectively, or to a direction parallel thereto. The largest sprocket in axial terms lies further inside than the smaller sprockets. The teeth are disposed radially on the outside of the sprockets. The rear derailleur has a so-called base element (B knuckle) which is assembled on the bicycle frame F rear tail 1, more specifically on the right dropout 1*b* of the latter. A so-called movable element (P knuckle), on which a chain cage is mounted so as to be rotatable about a rotating shaft, is connected to the base element by way of a pivoting mechanism. The pivoting mechanism of the rear derailleur can be embodied as an oblique parallelogram.

The derailleur RD of a special, relatively new type shown here is fastened to the right dropout 1*b* of the frame F rear tail 1 without the use of a separate derailleur hanger. The base element (B knuckle) of the derailleur is embodied for an assembly on the dropout, coaxial with the rotation axis A, by an inner and an outer arm or arm portion of the base element, said arms or arm portions being fixedly held on the dropout 1*b* on the internal side and the external side of said dropout, as is known from the first and unexamined publication DE 10 2018 001 253 A1 and corresponding documents such as EP 3 388 324 A2 and US 2018/0265169 A1.

Figure 7:
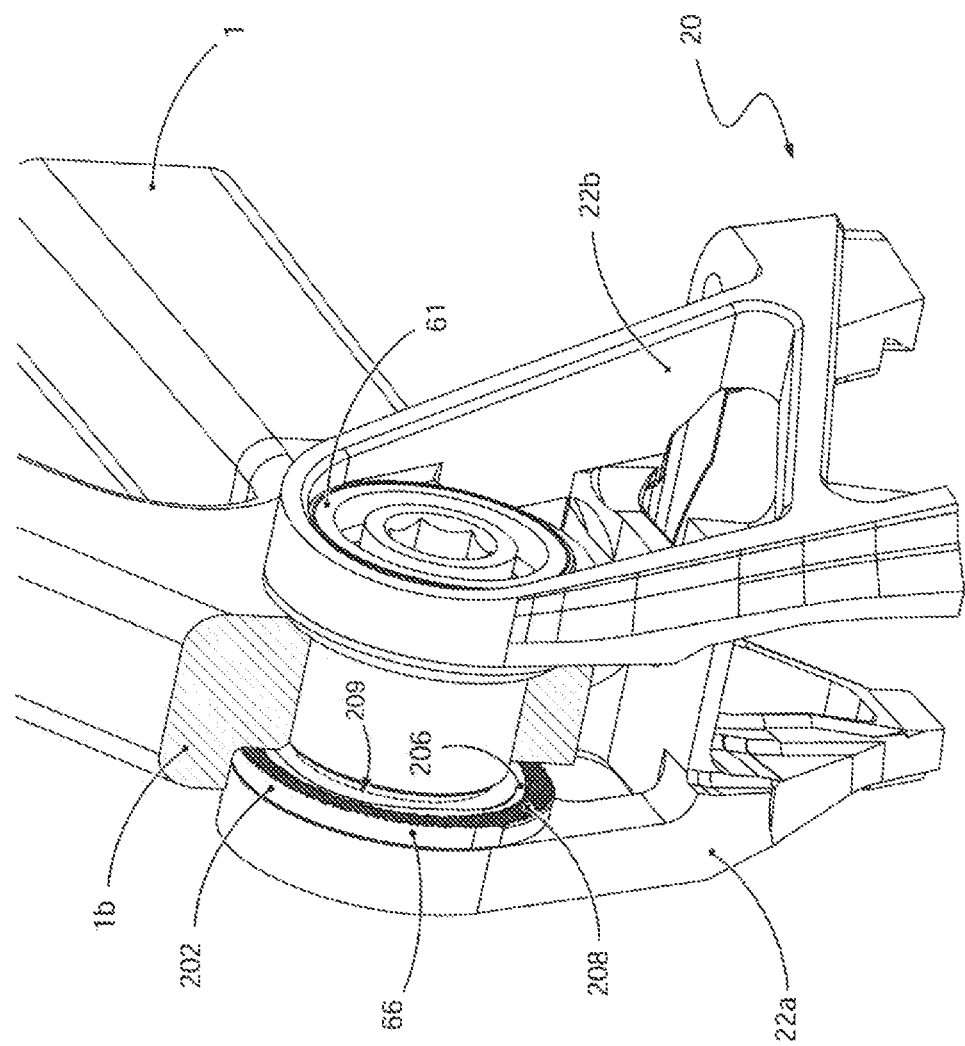
FIG. 7 shows the arrangement of FIGS. 5A and 6 in a further perspective view seen obliquely from the rear, having the frame hanger illustrated in a sectional view.

The rear derailleur, capable of being assembled so as to be coaxial with the rear axis of a bicycle, and the assembly of said rear derailleur on the bicycle frame, is described in detail in the patent application filed by SRAM Deutschland GmbH and published as DE 10 2018 001 253 A1 (DE'253) already mentioned. The derailleur is fixed to the frame hanger or dropout of the rear tail 1 of the bicycle frame F by way of an adapter 60, said frame hanger or dropout being designed to this end; cf. above all FIGS. 2 to 7 and, in particular, FIG. 8 in DE'253. FIG. 1 of DE'253 is contained as FIG. 2A, FIG. 2 of DE'253 is contained as FIG. 2B, FIG. 4 of DE'253 is contained as FIG. 3A, FIG. 7 of DE'253 is contained as FIG. 3B, and FIG. 8 of DE'253 is contained as FIG. 4 in the present set of figures.

Figure 2A:
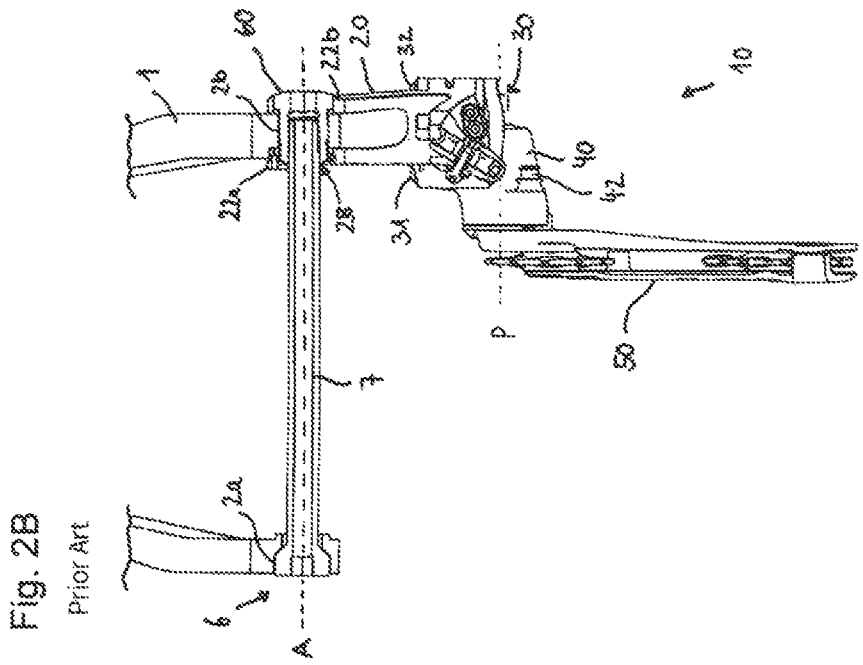
FIGS. 2A and 2B shows FIGS. 1 and 2 of DE 10 2018 001 253 A1 (DE'253)

FIG. 2A shows a perspective view of the known rear derailleur 10 according to DE'253. The rear derailleur 10 is assembled so as to be coaxial on the rear wheel axle 6. The rear wheel and the sprocket pack are not illustrated for the sake of improved clarity. To be seen are the rear wheel hub 3 that is disposed between the two dropouts of the frame rear tail 1, and the derailleur 10 encompassing the right dropout. The base element 20 by the adapter 60 is assembled on the frame rear tail 1 so as to be coaxial with the axis A.

Figure 2B:
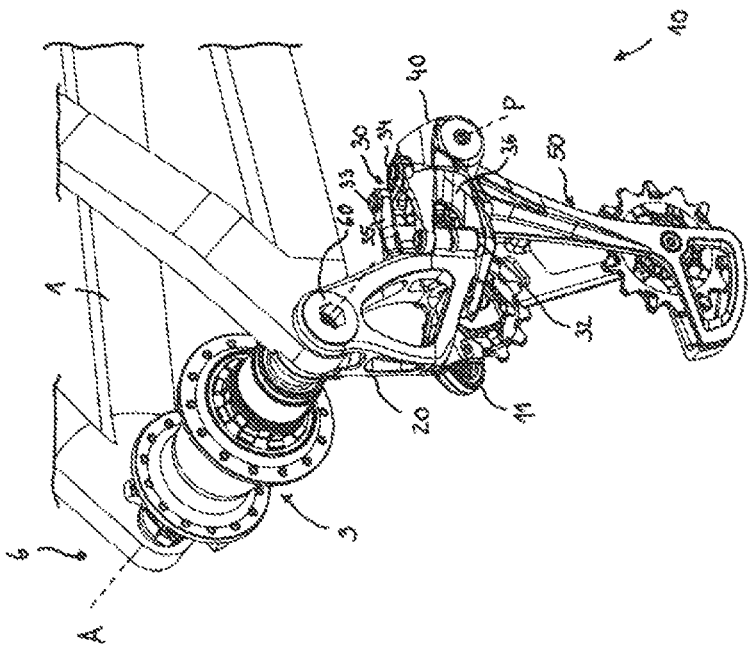

FIG. 2B shows a section along the axis A of the derailleur 10 illustrated in FIG. 2A, seen from the rear. The geometric axis A extends along the rear wheel axle 6. For the sake of simplicity, only a stud axle 7 and not the other parts of the axle and hub assembly are shown in this illustration. The base element 20 is fastened to the right dropout by the adapter 60. To this end, the adapter 60 penetrates the right frame opening 2*b*. The stud axle 7 is pushed into the left frame opening 2*a* and is screwed to the adapter 60. The adapter 60 simultaneously serves as a counter bearing for the stud axle 7. When the stud axle 7 is tightened, the latter is screwed further into the adapter 60 and is clamped in relation to the frame rear tail 1.

Figure 3B:
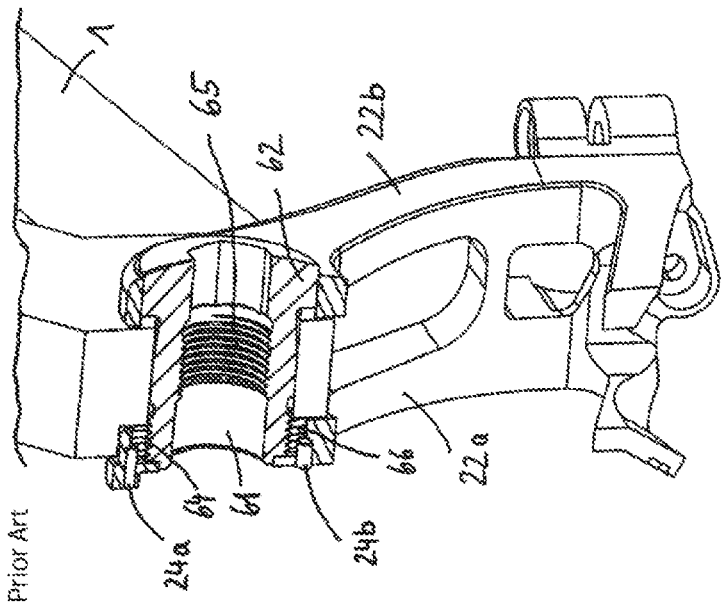
FIGS. 3A and 3B shows FIGS. 4 and 7 of DE'253.
Figure 3A:
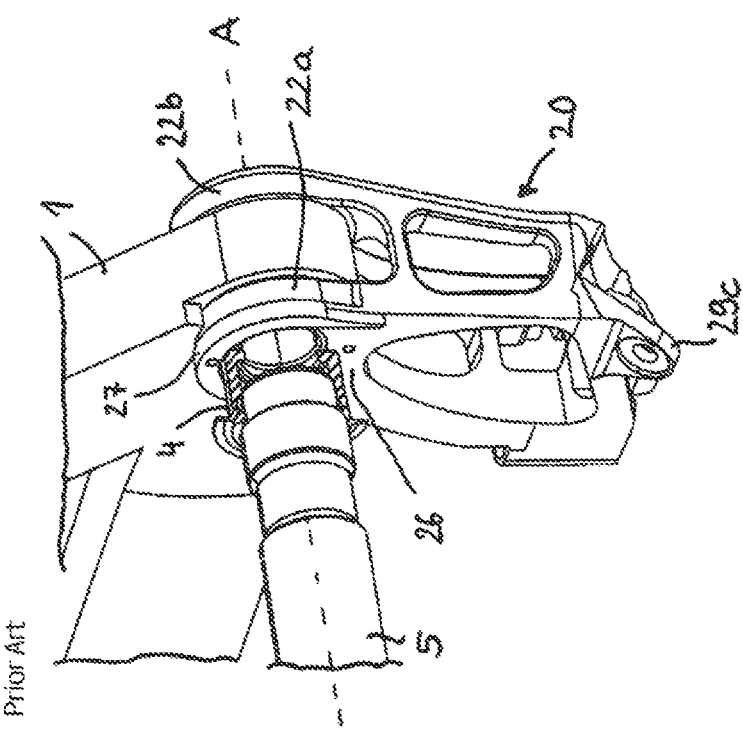

FIG. 3A in a perspective sub-section shows the base element 20, the latter assembled on the frame 1 with the aid of the adapter 60, and parts of the hub assembly. The first arm 22*a* and the second arm 22*b* are in each case positioned on one side of the frame 1. In order for the rear wheel, not shown here, to be assembled, the latter conjointly with the hub assembly (only a hollow axle or hub axle 5 is shown here) and a hub end cap 4 are guided along a hub guide 27 on the internal side of the base element 20. The hub guide 27 is configured as a bead with converging guide faces. The hub end cap 4 in the terminal position thereof bears radially on the hub guide 27. In the axial direction, the hub end cap 4 abuts an axial hub detent face 26 on the internal side of the base element 20. The hub end cap 4 is illustrated in a sectional manner.

Figure 4:
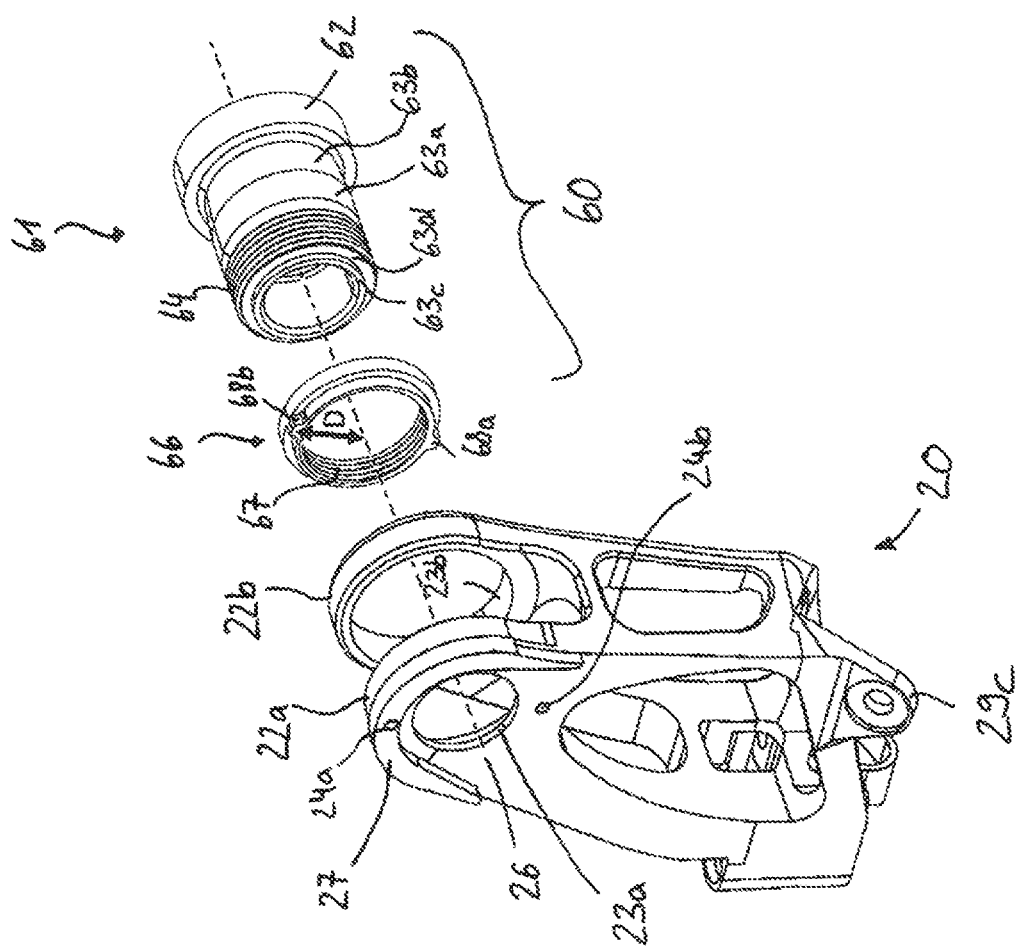
FIG. 4 shows FIG. 8 of DE'253.
Figure 5:
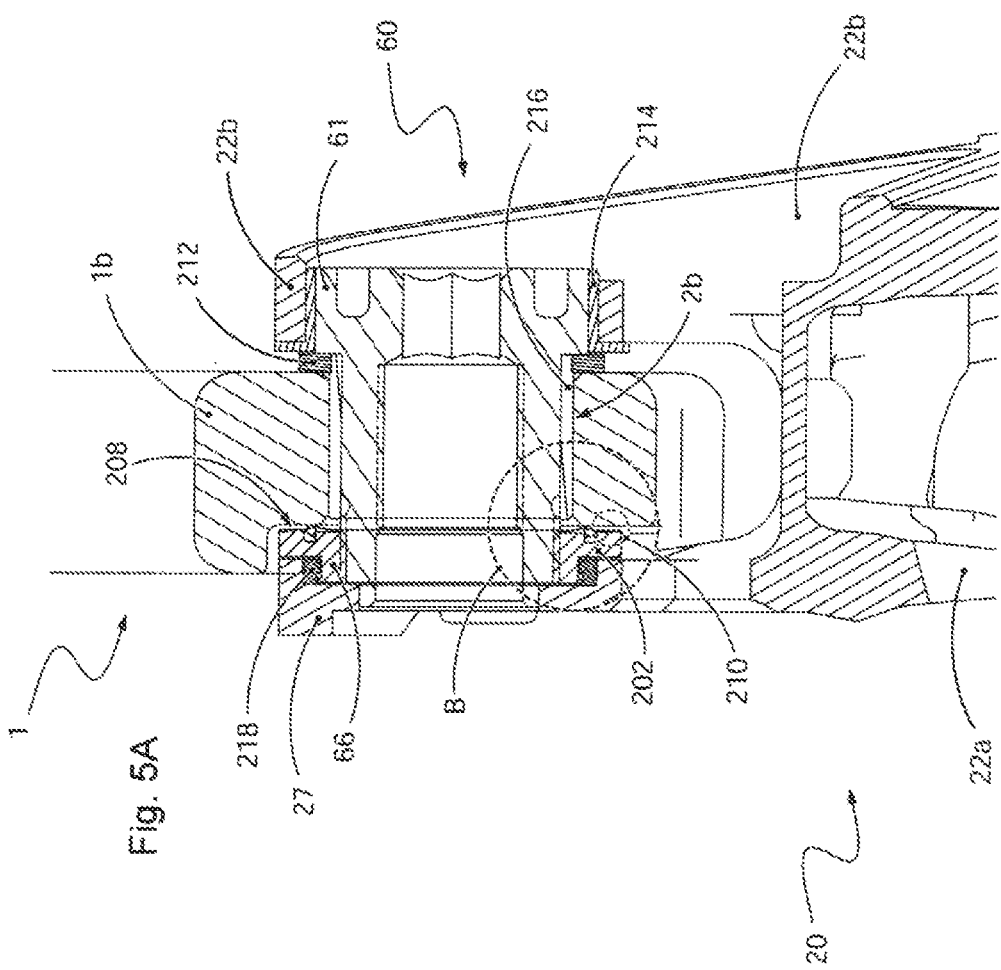
FIG. 5A shows a sectional view of a base element of a rear derailleur according to a first exemplary embodiment of the disclosure, said derailleur being illustrated without the pivoting mechanism, the movable element and the chain guide assembly thereof, specifically in a defined pre-assembled state in which said derailleur is disposed on a right frame hanger of a rear tail of a bicycle frame.
FIG. 5B shows a detailed enlargement of the region B of FIG. 5A.
Figure 6:
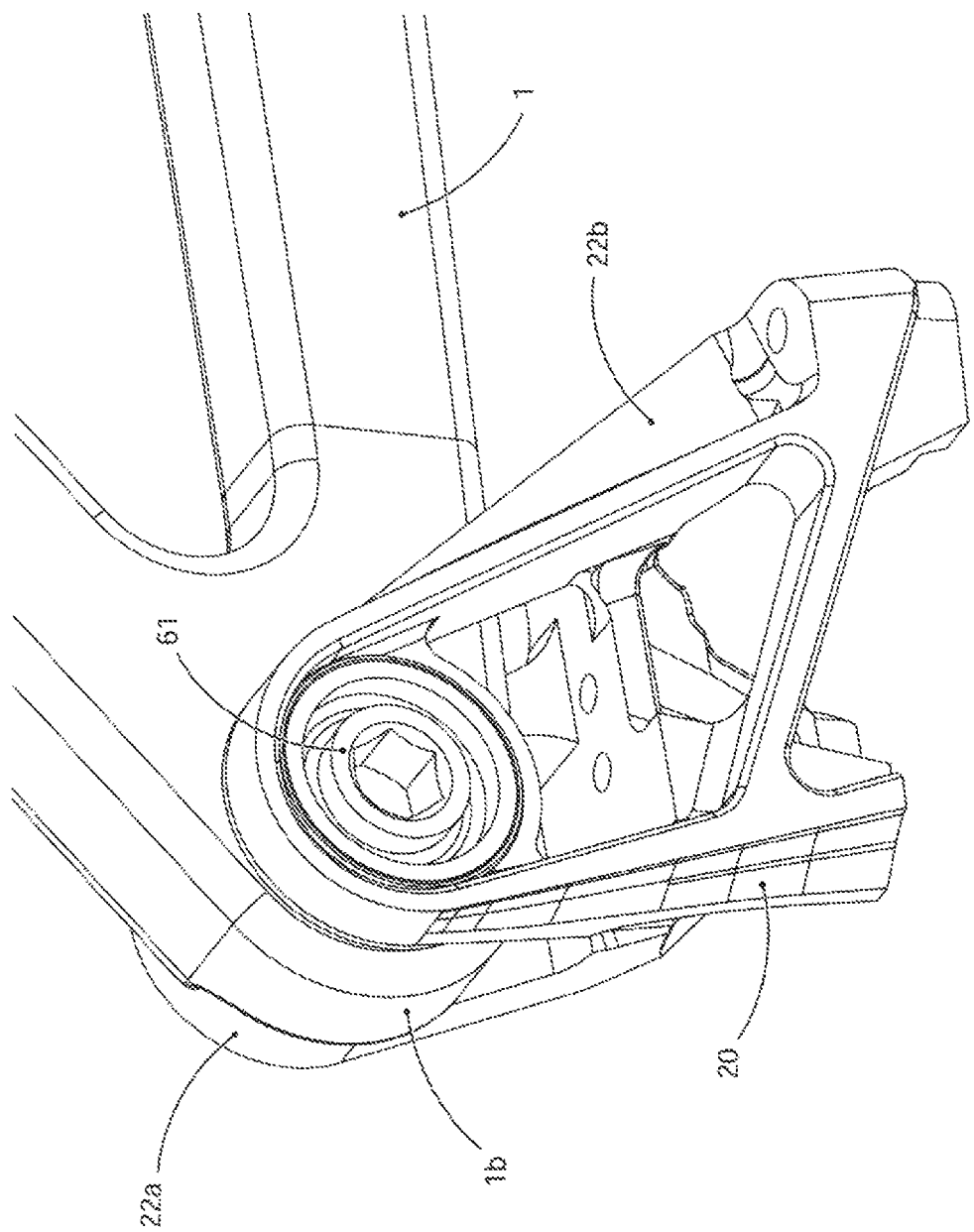
FIG. 6 shows the arrangement of FIG. 5A in a perspective lateral view seen from a right external side.

FIG. 3B shows an enlarged sub-section of the base element 20 which by way of the adapter 60 is assembled on the frame rear tail 1. The adapter 60 is also illustrated in a sectional manner. The bolt head 62 and the nut 66 are sized so as to be larger than the frame opening 2*b*. When the adapter 60 is tightened, the bolt head 62 and the nut 66 bear in a friction-fitting manner on the frame rear tail 1. The nut 66 for establishing a particularly strong frictional connection and optionally, depending on the design and the material of the frame dropouts in the bearing region for the nut, additionally a form-fitting connection to the frame rear tail 1 so as to counteract any rotation of the derailleur 10 towards the front (counter to the clockwise manner), has a knurled face 69 that can be seen in FIG. 6 of DE'253. As can be seen in FIG. 4, the bolt body 63 has a bearing region 63*a* which bears with little clearance on the frame opening 2*b*, and a compensation region 63*b* which has more clearance in relation to the frame opening 2*b*. The compensation region 63*b* enables the adapter 60 to align along the axis A in the frame opening 2*b*. The bolt 61 has a clearance in the frame opening 2*b* and can tilt somewhat in the latter should the frame opening not be in perfect alignment with the axis A.

Figure 8:
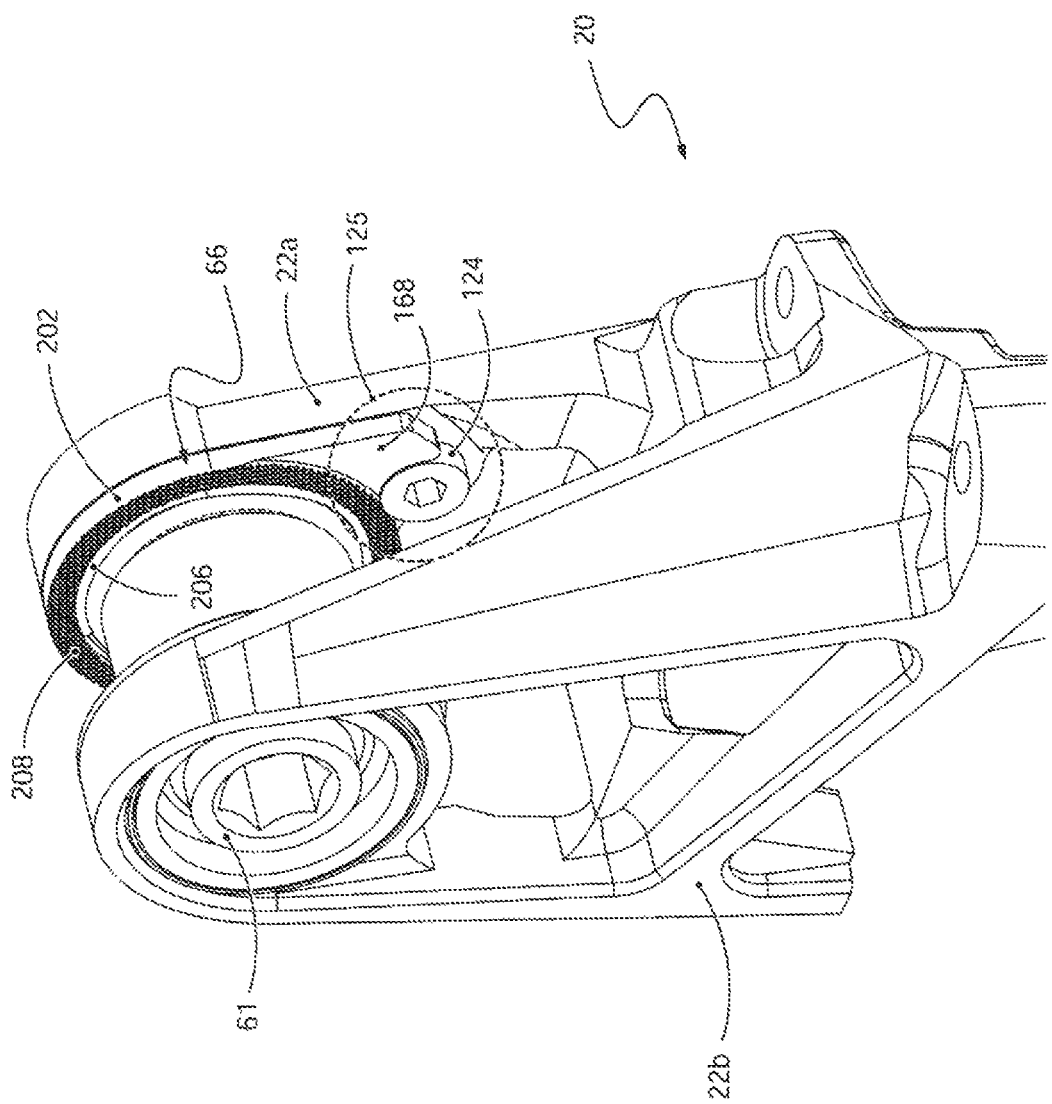
FIG. 8 shows the rear derailleur in a further perspective view seen obliquely from the front, without the frame hanger.

In comparison to the original FIG. 8 of DE'253, a double arrow and a reference sign D assigned to it which indicates an effective support radius and thus an effective support diameter has been added in FIG. 4, said support radius and said support diameter bearing against one another for the mutually interacting detent faces 68*a* and 68*b* of the adapter nut 66, on the one hand, and of the detent faces 24*a* and 24*b* of the base element 20 formed by axially projecting pins or bolts of the inner arm 22*a* on the inside of the base element 20, on the other hand.

The adapter 60 has two tasks: 1) The clamping on the frame rear tail 1 is established by the screw connection between the bolt 61 and the nut 66. It is important that the adapter 60 is able to be established in relation to the frame 1 and in the axial direction is able to be adapted to the latter. For example, the screw connection can be tightened more in the case of a thinner frame dropout 1*b* than in the case of a thicker frame dropout 1*b*. 2) The adapter 60 in the clockwise manner is rotatable only to a limited extent in relation to the base element 20 and thus represents an anti-rotation safeguard and a forward detent. To this end, two detents 68*a*, 68*b* which interact with two pins 24*a*, 24*b* on the base element 20 are disposed on the nut 66; cf. FIG. 3B). A rotation of the derailleur 10 towards the front (counter to the clockwise manner) between the adapter 60 and the base element 20 is possible only to a limited extent by virtue of the anti-rotation safeguard. The anti-rotation safeguard replaces the customary B screw and protects the derailleur against being unintentionally rotated towards the front. The pivoted position of the base element 20 on the frame rear tail 1, defined by the pins 24*a*, 24*b* impacting the detents 68*a*, 68*b*, results in a corresponding tension of the chain guided by the chain guide assembly 50 and in a corresponding spacing of the upper-most chain guide roller from a reference sprocket of the sprocket pack (so-called "chain gap").

DE'253 proposes the following assembly steps for assembling and adjusting the rear derailleur on the bicycle frame rear tail:

i) The derailleur 10 is pre-assembled on the frame rear tail 1 by the base element 20 and the adapter 60. To this end, the base element 20 encompasses the right dropout of the frame rear tail 1, and the adapter 60 is inserted and screwed into the frame dropout opening 2b and the centering openings 23a, 23b in the base element 20. The adapter 60 is screwed in so far that said adapter 60 conjointly with the base element 20 is held so as to still be rotatable on the frame rear tail 1 (cf. FIGS. 6 and 7 of DE'253).

After the first assembly step, the adapter 60 and the base element 20 are positioned in a preliminary manner in the axial and the radial direction in relation to the frame rear tail 1, but are not yet tightened. The adapter 60 and the base element 20 are rotatable about the axis A in relation to the frame rear tail 1.

ii) The rear wheel together with the entire hub assembly is inserted, and the stud axle 7 is screwed in but not yet fully tightened (cf. FIGS. 1 to 3 of DE'253, without the illustration of the rear wheel). The derailleur 10 in the not yet tightened state can still be rotated about the rear wheel axis A.

iii) The adapter 60 is tightened. The bolt 61 conjointly with the nut 66 is rotated in the clockwise manner in relation to the base element 20 until the detents 68a, 68b of the nut 66 meet the counter detents 24a, 24b of the base element 20. When further rotated, the base element 20 and the entire derailleur 10 are entrained by virtue of the detents until the chain is tensioned. In the tensioned position, the base element 20 as well as the nut 66 are established so that the bolt 61 is screwed into the internal thread 67 of the nut 66 until the adapter 60 has been tightened on the frame rear tail 1.

In order to be able to transmit sufficient entrained rotational forces from the adapter bolt 61 to the adapter nut 66 by way of the thread pair formed by the external thread 64 of the adapter bolt 61 and the internal thread 67 of the adapter nut 66, this thread pair can and should be provided, preferably ex works, with a screw locking mechanism.

Figure 10:
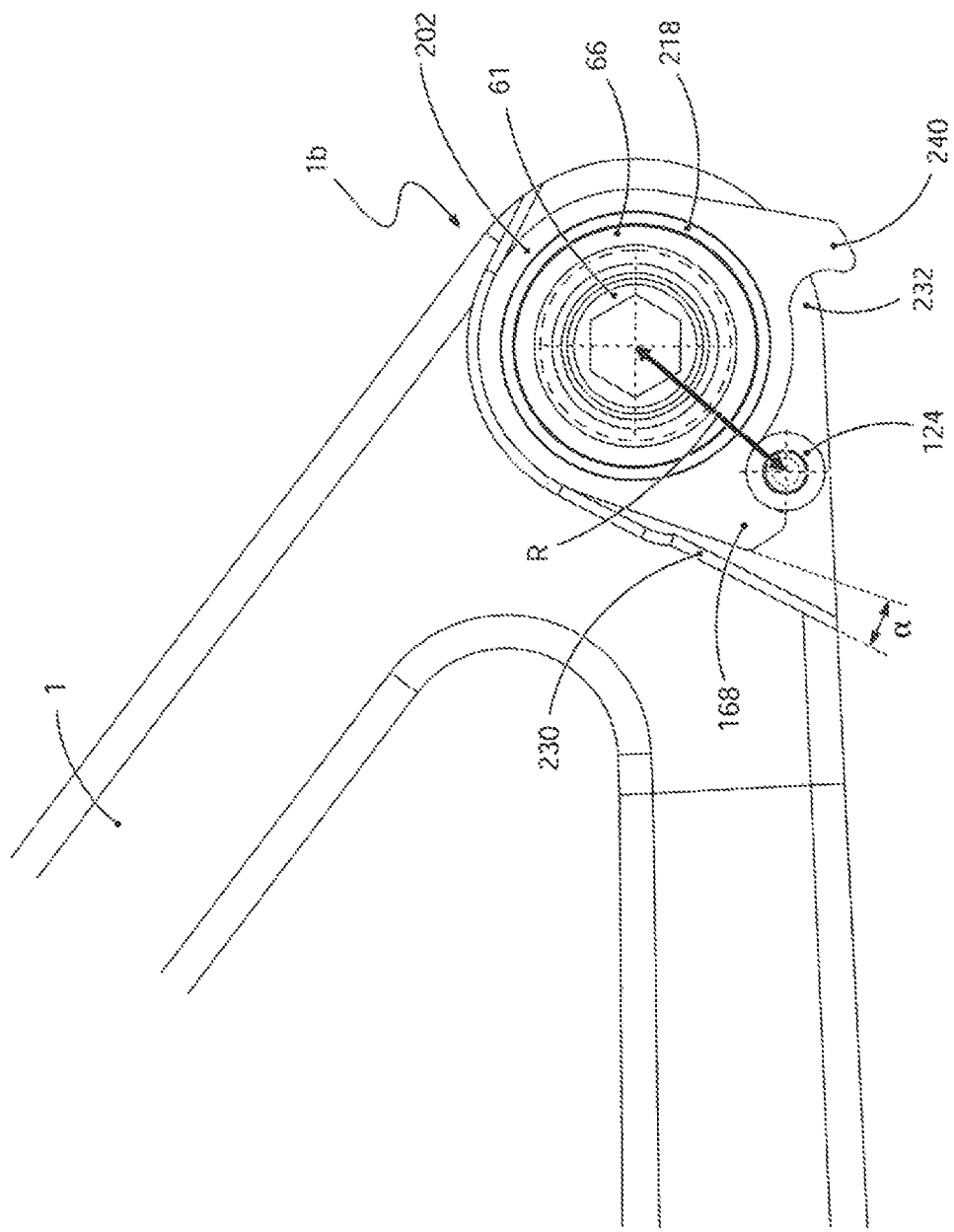
FIG. 10 in an illustration corresponding to that of FIG. 9 showing a variant embodiment of the first exemplary embodiment.
Figure 11:
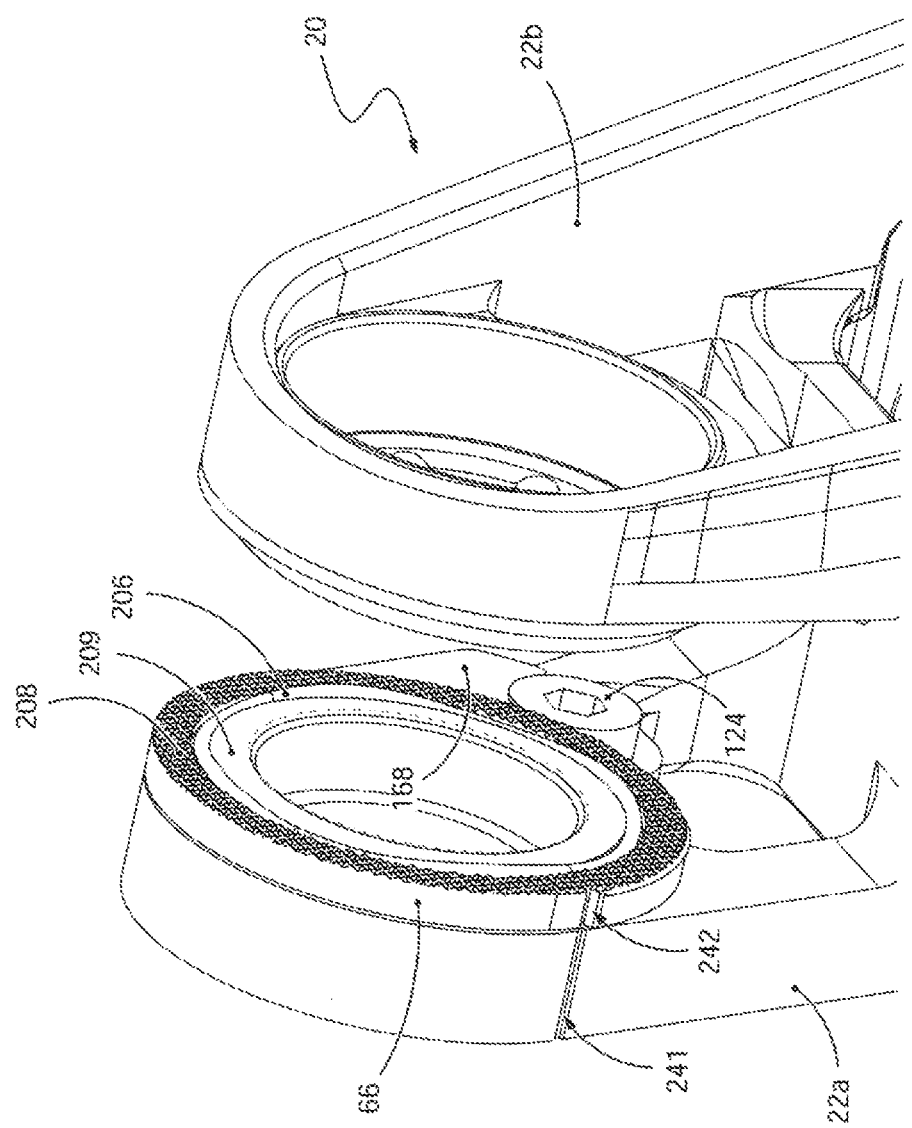
FIG. 11 shows the arrangement of FIG. 8 seen from another perspective, without an illustration of the adapter bolt.
Figure 12:
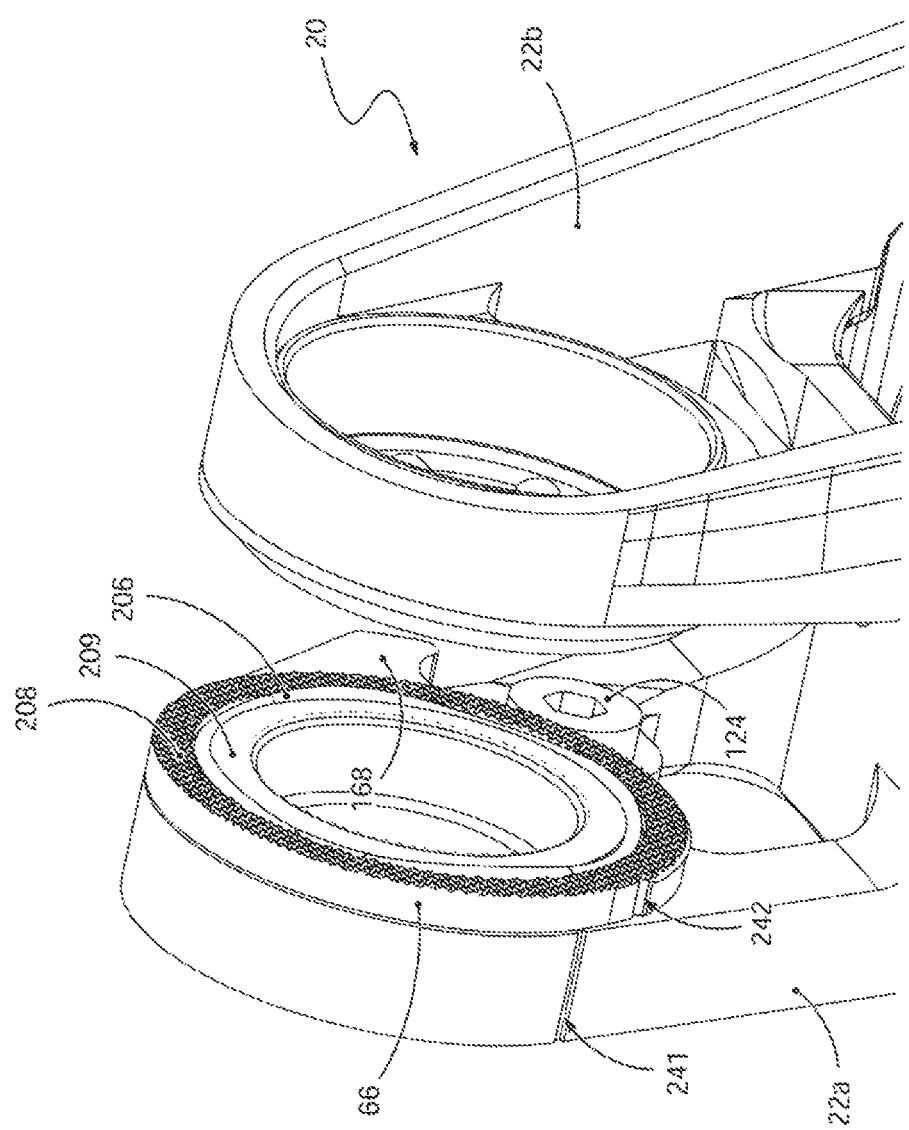
FIG. 12 in an illustration corresponding to that of FIG. 11 showing the illustrated components in another state.

An adjustment aid may optionally be used. An adjustment locking mechanism as is shown in FIG. 10 of DE'253 would be conceivable. The locking mechanism 42/58 establishes the chain guide assembly 50 that is rotatable about the axis P in a specific angular position and thus predefines the desired spacing between the upper chain roller 51 and a reference sprocket. To this end, the derailleur 10 is shifted to a reference gear, or to a reference sprocket respectively, the chain guide 50 is locked, and the base element 20 conjointly with the entire derailleur 10 is rotated towards the rear about the rear wheel axis A until the ideal chain tension is achieved.

iv) The stud axle 7 is tightened in the adjusted position, and the locking mechanism is released. The inner arm 22a is clamped between the hub end cap 4 and the adapter 60 by tightening the stud axle 7. As a result, the arm 22a, conjointly with the entire base element 20 and the derailleur 10, is aligned so as to be orthogonal to the hub end cap 4, or to the rear wheel axis A, respectively. Tolerances and substantial inaccuracies of the rear frame, dropouts and the rear derailleur hanger which is required by the state of the art are then no longer relevant for this alignment.

In terms of further details of the construction and the manner of assembling the known derailleur 10 on a bicycle frame, reference is explicitly made to the entire content of the first and unexamined publication DE 10 2018 001 253 A1 or one of the corresponding publications of the same patent family. The manifold advantages in terms of the ruggedness, the precision of the chain guide and of the shift procedure as well as simplification of the assembly process are thus also explained in detail therein, cf. in particular paragraphs [0013], [0041], [0057], [0064], [0090 iv], [0097], [0100] in DE'253. The function of the adapter 60 having a bolt or adapter bolt 61 and a nut or adapter nut 66 is significant in this context, as is also derived from the above explanations pertaining to this known solution.

The disclosure described here now relates above all to aspects of the adapter and the interfaces of the latter to the frame rear tail and the base element 20, the latter in the industry also referred to as the B knuckle; cf. FIGS. 1 to 10 in DE'253.

In the description hereunder of embodiments according to the disclosure, the same or analogous reference signs as in the description and the figures of DE'253 are used in the following manner: The same reference signs as in DE'253 are used for elements which are substantially identical to the corresponding elements of the known solution according to DE'253, or are modified to a minor extent in comparison thereto. The reference signs from DE'253 augmented by the numerical value 100 are used for elements which fulfil functions that are analogous to elements of the known solution according to DE'253 but differ to the latter in terms of structural aspects. New reference signs in the numerical range starting with 200 are used for elements which do not have a prototype in the known solution according to DE'253 or are not identified by reference sign in DE'253. In the description hereunder, reference signs from the numerical range 0 to 99 that cannot be found in the figures of the present set of figures refer to elements illustrated in the figures of DE'253.

According to a first theme of the disclosure, the focus is on guaranteeing a necessary adjustment capability of a base element 20 of the rear derailleur on the bicycle frame by the adapter in the course of the assembly, and to this end inter alia a reliable impact of a detent face or a plurality of detent faces 168 of the nut, or adapter nut 66, respectively (cf. the detents 68a, 68b of the adapter nut 66 according to DE'253) on a detent face or a plurality of detent faces 124 of the base element 20 (cf. the detent faces 24a, 24b of the base element 20 according to DE'253).

When mention hereunder is made of detent faces of the nut or the adapter nut 66, and of detent faces of the base element 20, this is intended to include the possibility that the adapter nut 66 has only one corresponding detent face, and that the base element has one only corresponding detent face, unless it is clearly derived from the respective context that there is a plurality of detent faces of the base element and/or of the adapter nut.

The bolt 61 by way of the adapter nut 66 is braced with the frame hanger during the assembly process. While the bolt 61 is being tightened, it is necessary in terms of the correct assembly of the derailleur that the nut 66 conjointly rotates until the detent faces 168, 124 (cf. 68A, 68b, 24a, 24b according to DE'253) of the nut and the base element are in mutual contact so as to, in the further tightening of the bolt 61, rotationally entrain the base element 20, and thus the derailleur that is pivotable in a coaxial manner about the rear axis, by the adapter nut 66 until the chain is tensioned. It has been demonstrated that parameters which are described hereunder and have a negative effect on this part of the adjustment procedure may arise.

a) Abrasion/removal of the screw locking mechanism conventionally provided ex works in the thread 67, 64 between the nut and the bolt, and/or greasing this connection by the user.

The entrainment torque that is created in the thread between the nut and the bolt when tightening the bolt and required for the adapter nut 66 to be properly entrained in the derailleur assembly, or derailleur adjustment, respectively, mentioned above and described in DE'253 can be heavily reduced as a result. An entrainment of the adapter nut 66 by the bolt 61 when tightening the bolt 61, and thus a corresponding entrainment of the base element 20 and of the entire derailleur, and thus the correct adjustment of the latter, is no longer guaranteed in this instance.

b) Prematurely contacting/gripping the knurled face 69 on the frame hanger when tightening the bolt 61 as described above.

As a result, the entrainment and rotation of the nut 66, and thus of the derailleur, about the rear axis during the derailleur assembly, or the derailleur adjustment, respectively, that is necessary for the orderly assembly or adjustment, respectively, of the derailleur may be inhibited. If the entrainment torque generated in the thread pair of the nut 66 and the bolt 61 and acting on the nut 66 by way of the bolt is insufficient for overcoming the frictional resistance of the knurled face on the frame dropout, the nut is thus not braced with the frame dropout at the correct angular position. The "correct angular position" of the adapter nut in this context is that angular position in which the base element 20, and thus the derailleur, is pivoted about the rear axis in a coaxial manner so far towards the rear, when viewed from the cyclist's perspective, that the envisaged chain tension and the required chain gap (spacing of the upper chain guide roller from a reference sprocket of the sprocket cassette) are achieved. Details pertaining to the adjustment of the chain gap of a bicycle drive train can be derived from the aforementioned DE'253 in paragraph [0090, iv] and in more detail from the first and unexamined publication DE 10 2020 210 354 A1 of the German patent application 10 2020 210 354.2, the former published on 25 Feb. 2021.

The disclosure provides a plurality of mutually complementary, specific solutions for these problems, said solutions to some extent also to be considered as alternative proposals for solving the problems. However, all these proposals for solving the problems may also be conjointly implemented.

According to one proposal of the disclosure, when tightening the adapter bolt 61 in relation to the adapter nut 66, it is prevented that the knurled face of the adapter nut contacts the associated bearing face on the frame hanger before the detent position of the detent faces 168 and 124 (cf. 68a, 68b, 24a, 24b according to DE'253) of the adapter nut and of the base element 20 on one another is achieved.

According to another proposal of the disclosure, the entrainment torque between the adapter bolt and the adapter nut is increased.

According to a further proposal of the disclosure, the holding torque between the adapter nut 66 and the base element is reduced, said holding torque being undesirable during the assembly or adjustment, respectively, of the derailleur because said holding torque suppresses the rotation of the adapter nut until the correct rotational position and detent positions of the latter is achieved on the base element 20.

One embodiment of the disclosure provides for a spring element to be integrated in the adapter nut, preferably in a groove. The groove is preferably provided in the region of the knurled face 69, or the contact face of the adapter nut to the contact face of the frame hanger, that is suitable for receiving a corresponding, preferably axially acting spring element, respectively.

The spring element according to the embodiment illustrated in the figures discussed in more detail hereunder, in the axial direction projects beyond the knurled face of the adapter nut in such a manner that the spring element, when tightening the adapter bolt, contacts the contact face of the frame hanger before the knurled face of the adapter nut can touch the contact face of the frame hanger.

It is ensured in this way that the spring element, when tightening the adapter bolt, is first partially pretensioned until the knurling of the adapter nut can grip the contact face of the frame hanger. When the bolt is thus tightened during the assembly or adjustment procedure, respectively, of the derailleur, an air gap between the contact face of the frame hanger and the knurled face is thus initially guaranteed as a result of the spring. When the adapter bolt is further tightened the spring element is further pretensioned, and the air gap is successively reduced. As the pretensioning of the spring element increases, the axial clamping force generated by the adapter bolt and the adapter nut increases, as a result of which the entrainment torque acting from the adapter bolt to the adapter nut also increases as a result of the increasing friction in the thread.

According to another embodiment, a friction-fit entrainment element can alternatively or additionally be provided, said friction-fit entrainment element being effective between the adapter bolt 61 and the adapter nut 66 and functioning, for example, according to the active principle of a self-locking nut so as to ensure a conjoined rotation of the adapter nut when the adapter bolt is rotated.

When the spring element or the friction-fit entrainment element is thus provided, or when both the spring element and the friction-fit entrainment element are provided, there is generally a sufficient entrainment torque available on the adapter nut 66 for reliably reaching the rotational detent between the detent faces, or detent elements 168 and 124, respectively (cf. 68a, 68b, 24a, 24b, according to DE'253) of the adapter nut and of the base element 20 before the knurling of the adapter nut grips the contact face of the frame hanger.

It can thus be ensured in the assembly or adjustment, respectively, of the derailleur that the adapter nut 66 is fixed so as to bear on the hanger frame in the correct rotational position and at the same time on the detent faces, or the detent face 124 of the base element 20, respectively. The correct rotational position of the adapter nut and thus of the derailleur about the rear axis then guarantees the desired or prescribed, respectively, chain tension and the desired, or prescribed, respectively, correct chain gap between the upper chain guide roller and the reference sprocket of the sprocket cassette.

Should only the friction-fit entrainment element be provided, it is to be noted that the adapter nut can nevertheless be embodied with a groove suitable for receiving the spring element, for instance in order to reduce the diversity of parts when embodiments with the spring element and embodiments without the spring element are to be produced, or in order to achieve a simple possibility for retrofitting the spring element if required.

In order to be able to correctly perform the described adjustment process in the assembly or the adjustment, respectively, of the derailleur even under particularly adverse parameters, further proposal solutions discussed hereunder can also be advantageously implemented, the features of said solutions being described in more detail hereunder with reference to the appended figures and also to be considered as individual proposal solutions that are independent from the previously discussed proposal solutions.

A radial groove of the adapter nut in the overlap region of the adapter nut and the left arm of the base element can thus serve as a receptacle for an annular element. This annular element serves as a friction bearing so as to guarantee a minor holding torque between the adapter nut and the base element when the adapter bolt is being tightened, and is made from a correspondingly suitable friction bearing material (POM, for example).

In a particular embodiment, the annular element in terms of the dimensions thereof is embodied such that the external diameter of said annular element in the overlap region between the annular element and the left arm of the base element establishes an interference fit with the internal diameter of the base element. The internal diameter of the annular element in turn has a clearance fit with the external diameter of the adapter nut in the groove region. A correspondingly reversed assignment of the internal diameter and the external diameter to an interference fit and a clearance fit of the annular elements is also to be considered. It is furthermore to be noted that the radial groove could alternatively also be embodied in the left (inner) arm of the base element.

By way of this arrangement, the annular element function as a friction bearing for the adapter nut in the base element, where an axial fixation of the adapter nut in the base element is additionally also implemented. This integration facilitates the assembly process and prevents that the adapter nut is lost in the disassembled state of the derailleur.

In one particularly preferred embodiment the axial clearance, thus the axial gap in the radial groove, between the one end of the radial groove of the adapter nut and the engagement protrusion on the annular element by way of which the latter engages in the radial groove of the adapter nut, is embodied in such a manner that this axial gap closes when the bolt is tightened and before the knurled face of the adapter nut grips the contact face of the latter on the frame hanger.

As a result, the annular element, by way of the axial friction face between the nut and the annular element, is extracted somewhat from the interference fit between the annular element and the base element when the bolt is further tightened. The force required for overcoming the axial holding force of this interference fit is provided by way of the thread between the adapter bolt and the adapter nut, thus implying increased frictional forces in this thread. The corresponding increase of the entrainment torque at this point in time of the tightening process on the adapter nut in turn is helpful for reliably achieving the rotational detent of the detent faces 168 of the adapter nut 66 on the detent faces 124 of the base element.

According to a second theme of the disclosure, the focus is on achieving a high holding torque between the adapter nut and the frame dropout.

The adapter nut and the adapter bolt in the assembled state are fixedly braced with the frame dropout as a result of the axial thread forces of the two former. During operation, significant forces are transmitted from the base element to the nut by way of the rotational detent of the detent faces 168 of the adapter nut 66 and of the detent faces 124 of the base element and from said nut directed onward into the frame rear tail.

The angular position of the adapter nut in relation to the frame dropout, correctly aligned in the adjustment process, must not be readjusted here in order for the correct operation of the derailleur to be guaranteed. It has been demonstrated that a high holding torque between the nut and the frame dropout is of great importance.

It is furthermore important that the tightening torque required in the adapter bolt for this holding torque is kept comparatively minor. As a result, the adjustment process should be able to be performed with tools of a correspondingly minimalistic size (a so-called multi tool) even in an emergency while outdoors. On the other hand, there is the risk of damaging frames of carbon or other lightweight construction materials that are optimized for weight in the case of high axial clamping forces between the adapter bolt and the adapter nut. Weight can also be saved in the basic design of the bolt and the nut when the pretensioning forces to be absorbed can be reduced.

In order for this issue to be solved, the disclosure proposes that an external flange is provided on the adapter nut 66. This flange is shaped in such a manner that the latter extends in a gap region provided therefor between the inner arm of the base element and the frame hanger.

Using this arrangement, a larger effective diameter of the adapter nut for receiving the holding torque between the frame hanger and the adapter nut can be implemented. Furthermore, the loss of area as a result of the spring groove (if provided) for the optionally provided spring element is compensated for by this enlargement of the diameter and the area of the contact face in the flanged region of the adapter nut.

It has also been demonstrated that a further reduction of the knurled face in the region radially within the spring groove may be advantageous. Relevant therefor is the axial pretensioning force and the shaping of the knurling. At a given knurling geometry and an axial pretensioning force, a value of the area can be determined that leads to optimal engagement conditions in the case of a defined frame material.

The knurling face determined is then preferably applied to the radially outer region of the available contact face so as to utilize the maximum effective diameter for the holding torque. The disclosure is suitable for equipping lightweight construction frames from composite materials with coaxial derailleurs, and for nevertheless guaranteeing the flawless operation even in extreme terrain.

According to a third theme of the disclosure, the focus is on achieving a high holding torque in the detent direction between the nut and the base element.

In the operating conditions in the terrain of the disclosure, high impulse forces from the base element 20 of the derailleur are directed into the system composed of the bicycle drive train and the frame rear tail. Accordingly, the interface between the base element and the adapter nut must also absorb high forces.

The disclosure solves this task in that the effective support diameter for this transmission of force or torque, respectively, from the base element 20 of the derailleur to the adapter nut 66 and from there by way of the knurled face of the adapter nut to the frame hanger and thus to the frame rear tail is significantly increased in comparison to the references, for example according to DE'253. The flanged region of the adapter nut is utilized to this end, or extended radially outward beyond the knurled face of the adapter nut, respectively. In a manner corresponding to the parameters predefined by the frame hanger or the frame interface, respectively, the counter detent 124 is attached to the base element 20 in the front region of the support structure on the inner arm.

The frame interface in this region offers additional available space which can be used for the assembly of adapters for non-coaxial derailleurs, the latter being known from DE 10 2018 206 104 A1 (DE'104) and DE 10 2018 222 834 A1 (DE'834), for example. This installation space is utilized for positioning the contact face, or the detent element 124, respectively, in an ideally radially far outward manner, on the one hand. On the other hand, this flanged region of the adapter nut is configured in such a manner that there is only a limited angular range available up to the potential impact of the flanged region of the adapter nut on the front detent of the frame interface. This front detent on the frame can thus be utilized for providing a holding force for the adapter nut when loosening the bolt, for example for disassembling the derailleur.

In contrast to the disclosed references, for example the aforementioned DE'834, the angular range up to the impact of the flanged region of the adapter nut on the front detent of the frame interface can be embodied in a significantly smaller manner, because this angular range in the arrangement according to the present disclosure does not project to the rear in the context of the pivoting range of the derailleur.

Two advantages are derived therefrom. On the one hand, the abrasion on the contact face of the frame hanger for the adapter nut is reduced as a result of the reduced angular range, said abrasion potentially being created as a result of the adapter nut conjointly rotating by way of the knurling of the adapter nut when the adapter bolt is loosened. On the other hand, only a minor, limited angular range has to be overcome in the adjustment process of the derailleur in this way, this contributing toward the fast and reliable achievement of the correct detent position of the flanged region of the adapter nut on the detent element 124 of the derailleur base element.

According to a fourth theme of the disclosure, the focus is on alternative design embodiments of the adapter nut. The adapter nut can advantageously be embodied with a second detent, as an alternative to the embodiment of the adapter nut with only a first detent.

According to the disclosure, there is the possibility of using an adapter nut having either one or two detent regions. These adapter nut can easily be interchanged, and the derailleur can thus be optimized for the respective range of application.

The advantage of an adapter nut having one detent region, apart from the saving in weight, lies above all in the large rearward pivoting range of the derailleur. As a result, the removal of the road wheel is facilitated, this being able to be carried out even when the derailleur is positioned below one of the larger sprockets of the sprocket cassette. This functionality can save valuable seconds in the event of defects when operating under race conditions.

As opposed thereto, the embodiment of the adapter nut having two detent regions delimits the rearward pivoting range of the derailleur. The fast removal of the road wheel is thus usually only possible when the derailleur is positioned in the region of the smaller sprockets of the sprocket cassette. However, the delimitation of the rearward pivoting range on the other hand helps in avoiding damage which could arise as a result of the derailleur being forcibly pivoted rearward. Situations of this type can arise when the chain is blocked in the derailleur cage, for example as a result of foreign objects being jammed. As a result of further pedalling, the derailleur is pivoted rearward by the force of the chain. This is of particular importance also in the case of electric bicycles or e-bikes, in which the propulsion force can be particularly high, or in the case of which the motor control often does not identify such jamming of foreign objects in the derailleur in a timely manner, this potentially resulting to derailleurs being torn off.

According to a fifth theme of the disclosure, the focus is on the easy identification of a malposition of the derailleur on the frame hanger, and on providing an aid for the correct (re-)adjustment of the position of the derailleur. To this end, the disclosure provides a so-called "crash indicator" (may also be referred to as a "B gap verification mark").

A functionality of the derailleur that can protect the derailleur and the frame from damage, above all in the event of crashes or frontal impacts as a result of contact with obstacles during the cycling operation, is described in the aforementioned patent application DE'253.

As a result of the friction-fitting coaxial fixation of the base element between the adapter bolt and the hub end cap 4, cf. FIG. 24a of DE'253, for example, the derailleur cannot be freely pivoted to the rear, as opposed to the conventional derailleurs that are not assembled so as to be coaxial with the rear axis.

Furthermore, the components of the derailleur assembly known from DE'253 are conceived such that a comparatively high force is correspondingly required for overcoming this friction-fitting connection so as to guarantee the correct positioning of the derailleur in the normal operation.

In the event of a high stress from the frontal direction, this friction-fit is however overcome before structural damage to the derailleur arises. As a result of this arrangement, energy can be absorbed in a controlled manner by way of the entire possible rearward pivoting angle of the derailleur, for example in the event of collisions between the derailleur and foreign objects during travel or in the event of crashes, the derailleur thus being protected against damage.

In order for the correct positioning of the derailleur to be restored after such events, the derailleur has however to be manually moved to the original mutual detent position between the detent faces 168 and 124 (cf. 68a, 68b, 24a, 24b according to DE'253) of the adapter nut 66 and the base element 20.

It has been demonstrated here that corresponding collisions and thus variations of the pivot angle of the derailleur relative to the rear tail often remain undetected by the user, in particular during the operation in extreme terrain, on the one hand. On the other hand, there are often also cases, however, in which the derailleur is not moved from the correct detent position between the detent faces 168 and 124 (cf. 68a, 68b, 24a, 24b according to DE'253) of the adapter nut 66 and the base element 20, even in the event of a crash.

These situations result in the set of issues that an incorrect positioning of the derailleur can remain undetected by the user, this compromising the performance and shifting quality of the drive train, on the one hand. On the other hand, users often unnecessarily attempt to reposition the derailleur after a crash, while said derailleur was never adjusted in the first place.

The disclosure solves these two sets of issues with a verification mark which is preferably readily visible to the user, for example having two display elements, one preferably on the base element and the other preferably on the adapter nut. The verification mark in the case of mutually aligned display elements visualizes the correct positioning of the detent element 124 of the base element on the associated front detent 168 of the adapter nut 66, and thus the correct pivot angle position of the derailleur in particular in relation to the chain tension and the chain gap.

When the derailleur is pivoted rearward, a visible distance between the display element on the base element and the stationary display element on the adapter nut that is fixed on the frame is thus created. This distance indicates that manual repositioning of the derailleur is needed, and can also provide the user with an indication of the impact energy absorbed by the derailleur. The user can thus judge the gravity of the collision and optionally decide to perform further functional checks or maintenance measures.

The derailleur in the subsequent repositioning is pivoted forward so far until the detent position between the detent faces, or detent elements 168 and 124, respectively, of the adapter nut 66 and the base element 20 is achieved again, the display elements thus also being in mutual alignment again.

The tactile check (resistance by the mutual detent of the detent faces, or detent elements 168 and 124, respectively) of this adjustment procedure is thus further enhanced by a visual check. This redundancy in practice is positively perceived by the user.

According to the proposals relating to the disclosure and the refinements thereof that will be explained in more detail hereunder by preferred exemplary embodiments, the following advantages are inter alia achieved: reduction in the erroneous assembly of the derailleur adapter nut; reduction in the erroneous assembly of the derailleur in terms of the rotational angle/chain gap; capability of maintaining and reproducing the derailleur adjustment even in the case of lacking or excessive maintenance; increased holding torque for maintaining the chain gap adjustment and the chain tension; reducible clamping force and lower contact pressure per unit area for the protection of lightweight construction frames; less abrasion of paint/material on the frame hanger when disassembling and assembling the derailleur; reduced tightening torque for adjusting the shift gear, for example outdoors; captive adapter nut; two interchangeable variants of the adapter nut ("extreme/race" and "protect/normal", for example); visual crash indication on the derailleur; visual indication of whether a crash has affected the derailleur and if so, how severely it has affected the derailleur.

Two preferred exemplary embodiments of the derailleur 10 will be explained in more detail hereunder by FIGS. 5 to 21. Only the base element and the rear tail 1 of the bicycle frame F, with the associated components, are illustrated in these figures. The pivoting mechanism, the movable element and the chain guide assembly can be embodied as in the known solution according to DE 10 2018 001 253 A1 (DE'253), the latter to be considered as the departure point for the description of the embodiments according to the disclosure. Only the points of differentiation of these exemplary embodiments in comparison to DE'253 are explained.

FIG. 5A shows a sectional illustration of the right side of the frame rear tail 1 of the bicycle frame F, including the base element 20 having the inner or left arm 22a thereof and the right or outer arm 22b thereof. The base element, in a manner analogous to the known solution of DE'253, is fastened to the frame hanger 1b of the rear tail 1 by an adapter 60. The adapter has the known adapter bolt 61 and the known adapter nut 66 which are mutually engaged by screwing. The adapter nut 66 is embodied with an external flange 202. All illustrated components are illustrated in a sectional manner. The rear tail 1 in the region 1b thereof, which can be seen in the figures and may also be referred to as the dropout instead of the frame hanger, is embodied with a right frame opening 2b which can be considered to be a frame hanger in the tighter sense and into which the adapter bolt 61 is introduced. However, the entire dropout, including a frame region that surrounds the frame opening 2b, is referred to as the frame hanger here. This may generally be referred to as a frame interface, or else as a mounting portion 1b of the frame. The adapter nut 66 on an axial internal side that faces the frame rear tail 1, in the radial region of the external flange 202, has a groove 204 in which a spring element 206 is received. The spring element is identified by the reference sign 204 only in FIG. 5B. The external flange 202 in the radial region outside the spring groove 206, on the face of said external flange 202 that faces the frame dropout, has an annular knurled face 208.

The spring element 206, preferably embodied as a steel spring, projects axially from the spring groove 204, thus from the knurled face 208. The spring element 206, as a result of being correspondingly pretensioned to this axially projecting position, ensures that the knurled face 208 in a pre-assembled state as illustrated in FIGS. 5A and 5B and in which the adapter bolt 61 has not yet been tightened, is kept at a spacing from the assigned contact face of the frame hanger 1b so that an axial air gap 210 between the frame dropout and the knurled face of the nut is maintained before the adapter bolt is tightened. It is thus prevented that the knurled face 208 prematurely grips the frame dropout in a friction-fitting or even form-fitting manner. At this location, it is at most the friction between the spring element 206 and the internal side of the dropout that acts in this instance. It is achieved as a result that the correct or desired angular position of the base element 20 can be adjusted by correspondingly rotating the adapter bolt 61 in the tightening direction of the latter.

Figure 15:
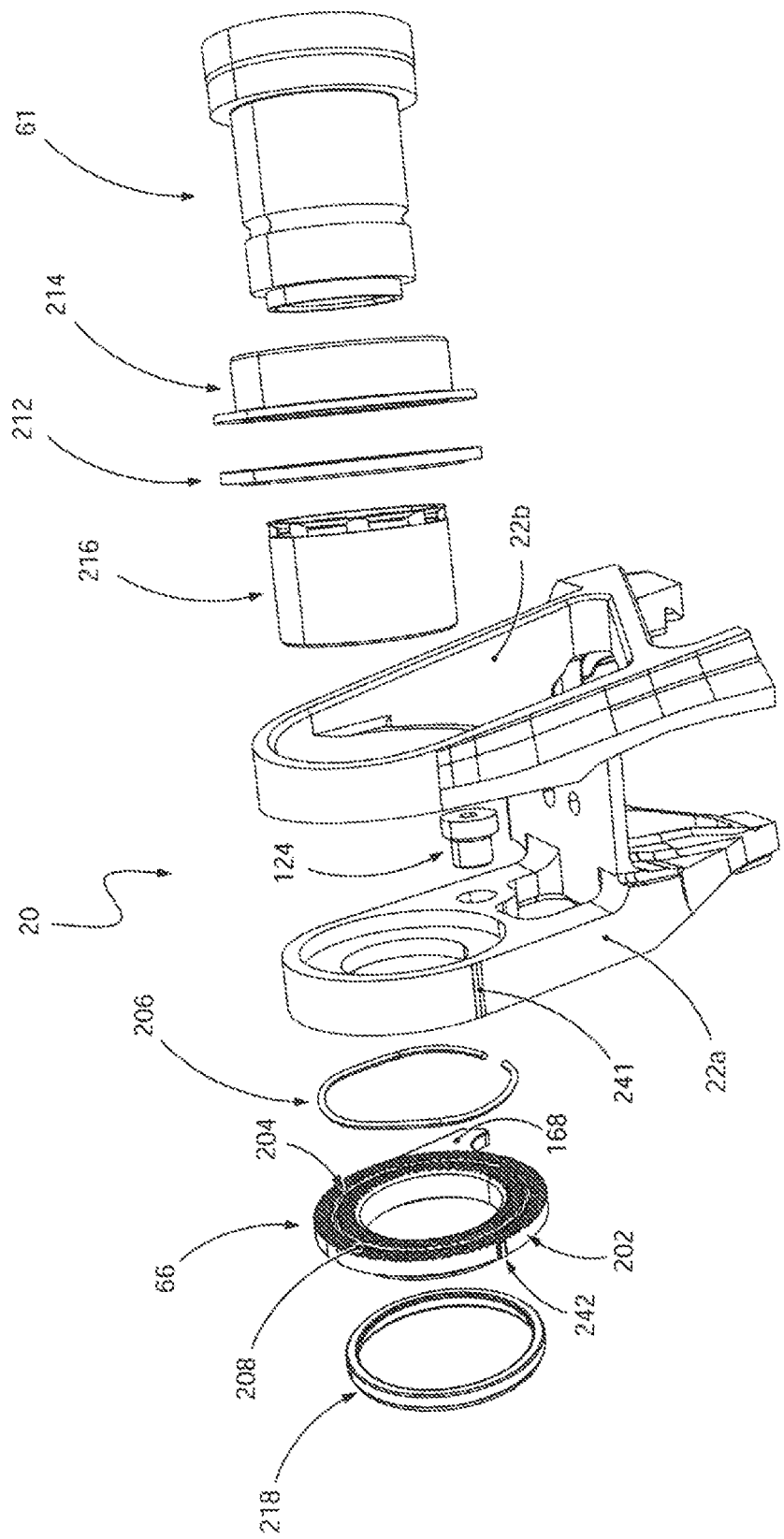
FIG. 15 shows components of the first exemplary embodiment in an exploded illustration.

With reference also to the exploded illustration of FIG. 15, the frame opening 2b, the adapter bolt 61 and the upper region of the second arm 22b can also be assigned bearing elements, for example an axially effective bearing collar 212, a radially and axially effective bearing bush 214, and a radially active bearing bush 216. These bearing elements can expediently be produced from a stiff and load-bearing capable friction bearing material, and serve predominantly for compensating the tolerances between the participating mutually movable components and for reducing the clearance between the adapter bolt and the frame dropout, or between the base element and the adapter bolt, respectively. A clearance-free fit of the right derailleur arm 22b in the adjustment procedure is thus also ensured. Moreover, delicate frame surfaces and materials are also protected. However, such bearing elements may also be dispensed with.

The embodiment illustrated is also distinguished by a special annular element 218 which is disposed in an axial and radial intermediate region between the adapter nut 66 and the inner arm 22a of the base element, specifically between the mutually facing axial faces of the inner arm 22a and of the adapter nut 66 and an outer circumferential face of the adapter nut 66 and an inner circumferential face of the inner arm 22a. The annular element 218 by way of a radially projecting annular bead portion 221 (cf. FIG. 16) engages in a radial annular groove 220 of the adapter nut 66 in the overlap region of the adapter nut and the left arm 22a. This annular groove 220 serves as a receptacle for the annular element 218 so as to fix the adapter nut on the inner arm 22a and thus in the base element 20.

The annular element 218 on the external circumference thereof is held on an internal circumference of an axially projecting bead region 248 (cf. FIG. 16) of the inner arm 22a by an interference fit 219, and on the internal circumference of said annular element 218 has a clearance fit with the adapter nut 66.

The annular element 218 can be produced from a suitable friction bearing material and makes available an axial friction face in the axial overlap region of the adapter nut and the left arm 22a of the base element 20. A friction bearing which is effective between the adapter nut 66 and the base element 20 is thus provided, so to speak, in order to reduce the friction between these components. As a result, a larger proportion of the rotational forces directed into the adapter bolt 61 in the tightening direction, more specifically of these forces consequently exerted on the adapter nut 66, is available for adjusting the angular position of the base element 20 on the dropout.

Figure 16:
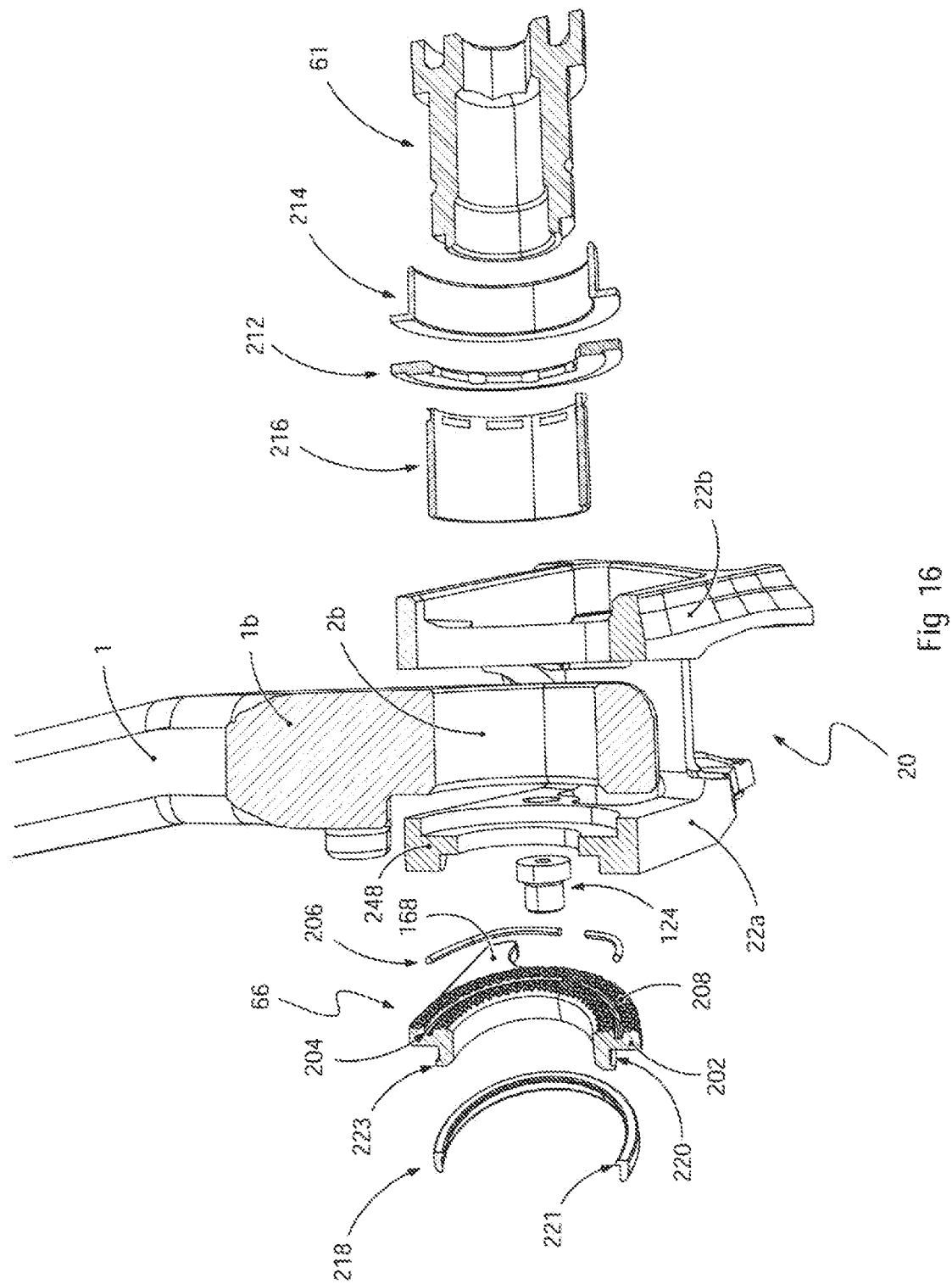
FIG. 16 shows the exploded view of FIG. 15 in a sectional illustration, including the frame hanger illustrated in a sectional view.

As can be seen in FIG. 5B, in the illustrated pre-assembled state there exists an axial gap 224 between the radially inward-projecting annular bead 221 of the annular element 218 and a radially outward-projecting annular bead 223 of the adapter nut 66 that delimits the groove 220 in the direction toward the inner arm 22a (cf. FIG. 16). In the illustrated pre-assembled state there thus exists an axial clearance between the annular bead of the annular element 218 and the annular bead of the adapter nut 66, said clearance being absorbed in the course of tightening the adapter bolt. The arrangement is preferably in such a manner that the two annular beads abut on one another in the last phase of the tightening of the bolt 61 in the adapter nut 66, when the spring element 206 is urged through the inner surface of the dropout 1b completely into the spring groove 204, and the annular element 218 by the adapter nut 66 is axially extracted somewhat from its interference fit 219 with the inner arm 22a, thus is entrained for a certain axial distance by the adapter nut 66.

As can be seen more specifically in FIGS. 7, 8 11 and 12, the knurled face 208 can be provided only outside the groove 200 and for that receives the spring element 206. An axial annular end face of the adapter nut that is embodied without any knurling and is radially within the groove 120 is identified with the reference sign 209 here. This face region of the adapter nut that faces the frame dropout can however likewise be embodied with a knurling, as shown in FIGS. 15 to 21.

In both cases, a high holding element between the knurling of the adapter nut 66 and the frame rear tail 1 is ensured once the adapter bolt 61 is tightened. This is achieved by the considerably larger effective radius of the knurling and the enlargement of the knurled face in comparison to the known solution of DE'253, by virtue of the external flange 202 which extends in an axial region between the inner arm 22a and the contact face on the frame hanger 1b.

In principle, there are various possibilities pertaining to how the interface 125 between the base element 20 and the adapter nut 66 could be designed to enable a transmission of rotational adjustment forces from the adapter nut 66 to the base element 20, based on rotational forces exerted in the tightening direction on the adapter bolt 61. A particularly expedient design embodiment can be seen in FIG. 8. The inner arm 22a of the base element is embodied with an axially projecting protrusion, specifically in the front region of a support structure on the inner arm, said protrusion providing a detent face 124.

The protrusion presently is formed by a preferably separate detent element that is embodied as a detent bolt, for instance, and for the sake of simplicity is likewise identified by the reference sign 124. This detent face 124, or this detent element 124, respectively, is assigned a radially projecting flanged region 168 of the external flange 202 of the adapter nut 66, said flanged region 168 forming the detent face of the adapter nut that is assigned to the detent face 124. For the sake of simplicity, the same reference sign 168 is used for this flanged region and for the detent face provided by the latter. The flanged region 168 and the detent element 124, or the detent faces provided by said flanged region 168 and said detent element 124, respectively, together form the mentioned interface 125 between the base element and the adapter nut, said interface in FIG. 8 being highlighted and identified by the circle 125 in dashed lines.

The flanged region 168 is preferably shaped in such a manner that there is only a limited angular range a available up to the impact on a delimitation of the frame interface. In particular, this limits wear or damage to the frame dropout surface caused by the knurled surfaces of the adapter nut in the event of any forcible forward rotation of the derailleur, and reduces this compared with the state of the art.

Figure 9:
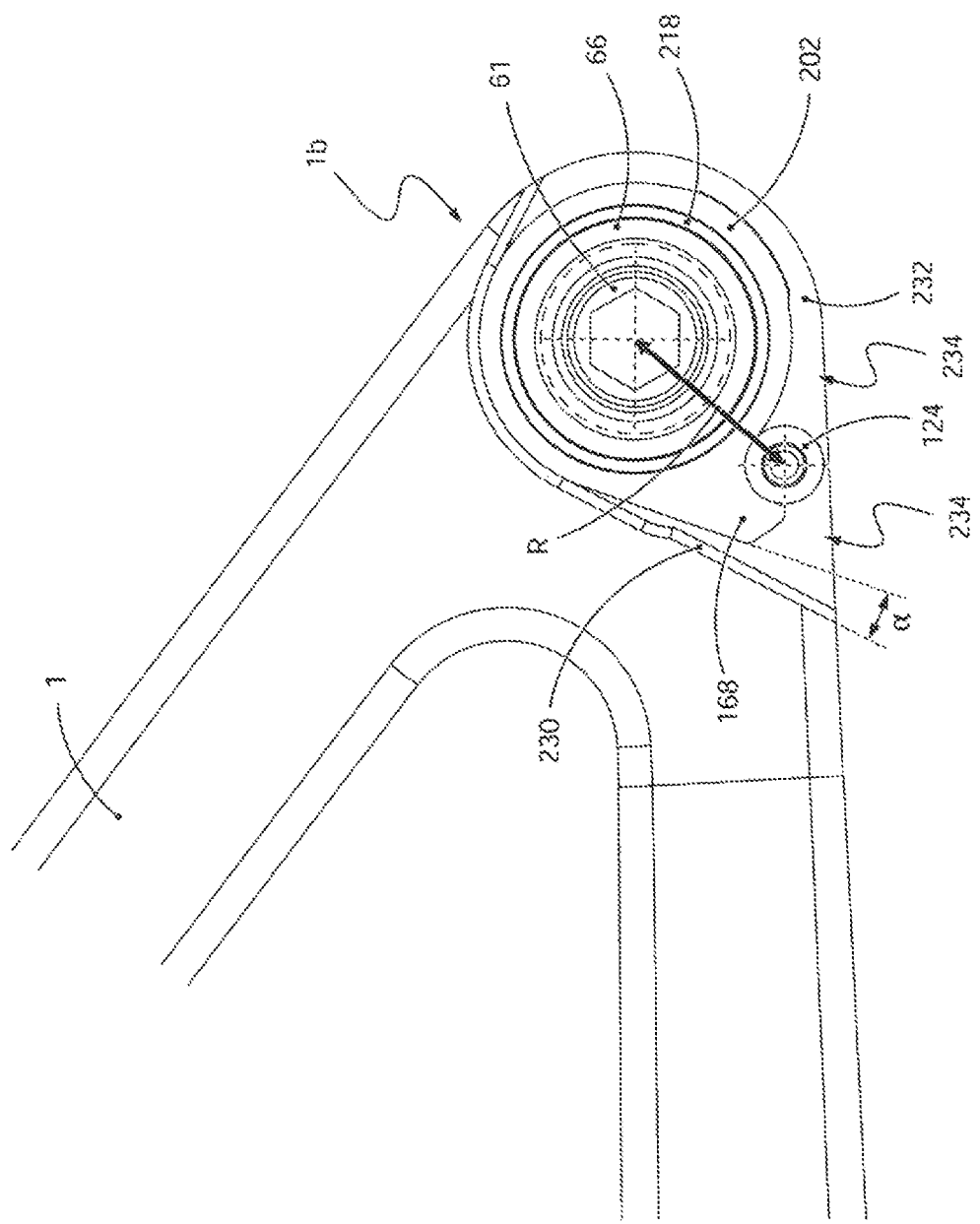
FIG. 9 shows a view of an internal side of the frame hanger for the embodiment of FIGS. 5 to 8.

The mentioned front detent of the frame interface can be seen in FIG. 9 and is identified by the reference sign 230. There is a limited angular range a, for example between 3 and 15 degrees, preferably between 7 and 9 degrees, between the flanged region 168 of the adapter nut 66 that serves as a detent and this front detent 230 of the frame rear tail. This angular spacing a in the illustration of FIGS. 9 and 10, here identified by a double arrow and two radial extensions in dashed lines, is 8 degrees.

FIG. 9 is an illustration corresponding to a view onto the internal side of the dropout 1b without the inner arm 22a of the base element that is held on said dropout 1b, but with the detent element 124a of said inner arm 22a and the annular element 218 that is situated in the press fit on the inner arm 22a.

The contact face on the frame for the adapter nut 66 on the frame hanger 1b is identified by the reference sign 232. As can be seen at 234, there exists available space for assembling adapters for non-coaxial derailleurs, for instance of so-called shift hangers as are known from patent applications by SRAM Deutschland GmbH and are specially adapted to the assembly situation of a frame rear tail originally provided for the coaxial assembly of the rear derailleur.

It is be noted that, as a result of the embodiment of the adapter nut 66 with the flanged detent portion 168 and the base element with the detent element 124, a comparatively large support radius and thus support diameter is achieved in terms of the geometric axis A illustrated in FIG. 2A. This support radius is represented by the double arrow R and is significantly larger than the support radius of the known construction according to DE'253 indicated in FIG. 4 by the added double arrow D.

FIG. 10 corresponds to the illustration of FIG. 9 and shows a variant embodiment of the adapter nut 66. The latter has a second detent region which, in a manner analogous to the detent 168, is formed by a radially projecting portion 240 of the external flange 202 and serves for delimiting the pivoting range of the derailleur 10 toward the rear. This detent 240 can likewise interact with the detent element 124 of the base element 20.

FIGS. 11 and 12 once again show the adapter nut 66 of FIGS. 5 to 9 in the position thereof held on the inner arm 22a, specifically in FIG. 11 in the engaging detent of the detent flange 168 of said adapter nut 66 on the detent element 124a of the base element 20, and in FIG. 12 in an assembled state in which this engaging detent between the detents 168 and 124 has not yet been established. Such a state can arise in the course of the base element being assembled on the frame. The detent flange 168 of the adapter nut 66 is first brought to bear on the detent element 124 of the base element 20 by exerting rotational forces on the adapter nut 66 by rotating the adapter bolt 61 in the tightening direction by a suitable tool, and rotational adjustment forces can then be exerted on the base element 20 by further rotating the adapter bolt 61 in the tightening direction by the adapter nut 66, so as to bring the base element 20 to the nominal angular position on the dropout 1b while at the same time achieving the desired tension of the chain of the chain shift mechanism.

Figure 13:
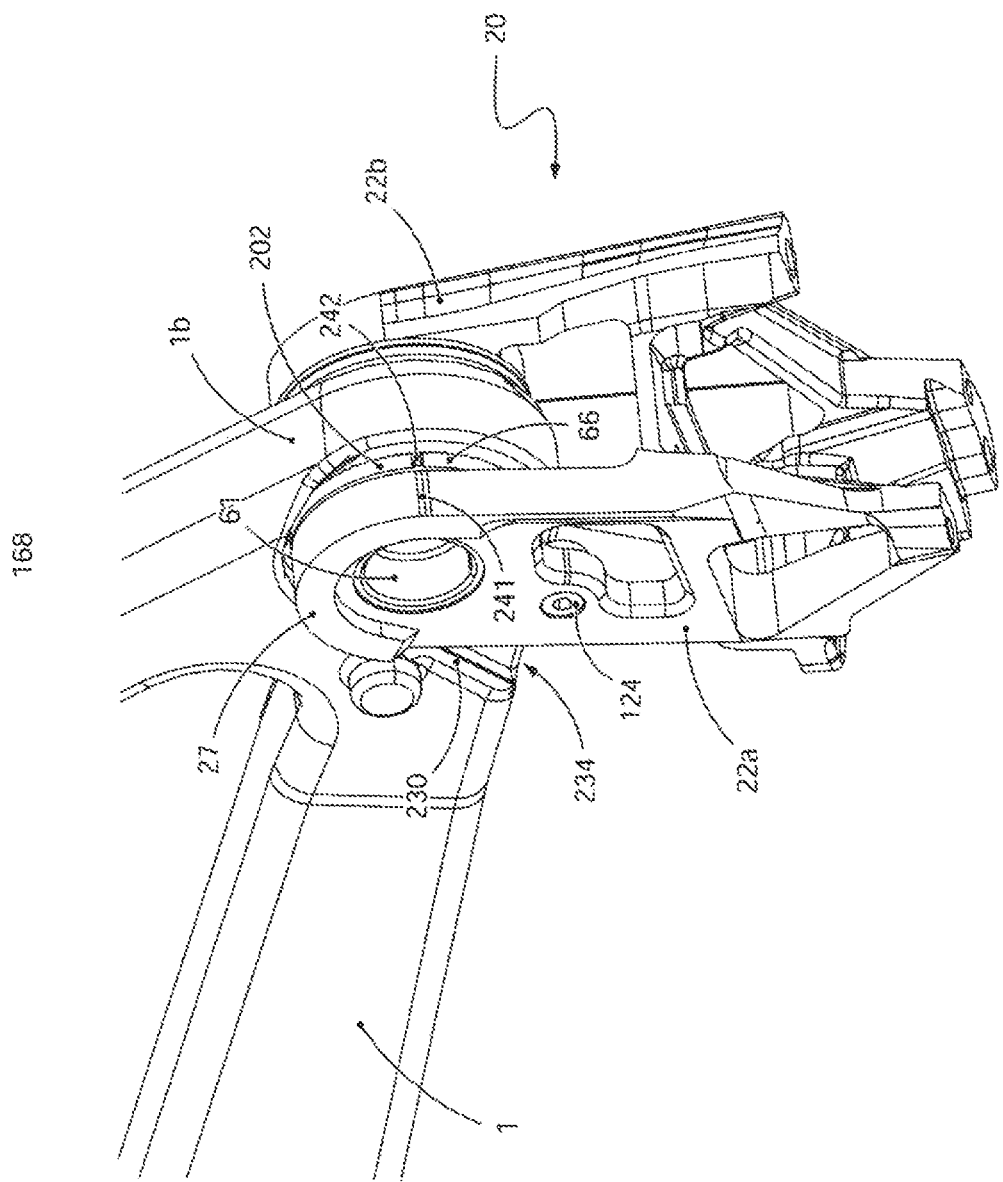
FIG. 13 shows the components of FIG. 5A in a perspective illustration, when viewed obliquely from the rear toward the internal side of the frame hanger, in a normal position or nominal position of the base element on the frame hanger.

FIG. 13 shows the base element 20 correctly and fixedly assembled on the frame rear tail, more specifically the dropout or the frame hanger 1b, such as said base element 20 as part of the complete shift gear with the associated pivoting mechanism, the movable element and the chain guide would be assembled on the frame rear tail so as to be coaxial with the rear wheel axle. The inner arm 22a in this instance is fixedly clamped between an inner side of the adapter nut 66 and a stator module of the rear wheel axle assembly, and is fixed in a friction-fitting manner in the angular position of said inner arm 22a. An identifiable support structure of the base element is identified with the reference sign 234. It can be seen that the detent 124 of the inner arm 22a is formed by a separate detent bolt that is screwed into a screw opening of the inner arm. Furthermore to be seen is a hub guide 27 on the internal side of the inner arm 22a of the base element 20, said hub guide 27 per se also being identifiable already in FIG. 5A.

FIG. 13 thus shows the normal angular position or nominal angular position of the base element 20 relative to the adapter nut 66 and thus relative to the frame hanger 1b. As has been set forth, the derailleur 10 conjoined with the adapter nut 66 is rotated rearward until the chain slack disappears and, upon further tightening of the adapter bolt 61 while rotationally entraining the adapter nut 66 and consequently rotationally entraining the derailleur 10 in the clockwise manner, the desired chain gap, or the chain gap envisaged by the manufacturer, respectively, is achieved. This corresponds to the mentioned normal position or nominal position of the base element 20 relative to the adapter nut 66 and thus relative to the frame hanger 1b, in which normal position or nominal position the adapter nut 66 also assumes a normal angular position or nominal angular position relative to the frame hanger, said normal angular position or nominal angular position in the completely assembled state being fixed in a friction-fitting manner on the frame hanger 1 by the rear axle assembly of the rear wheel of the bicycle.

The base element assuming this normal position or nominal position can be very easily identified by a visual and/or tactile mark 240 on the inner arm 22a of the base element and an assigned visual and/or tactile mark on the external circumference of the external flange 202 of the adapter nut 66, said marks being in mutual axial alignment in the illustration according to FIG. 13.

Figure 14:
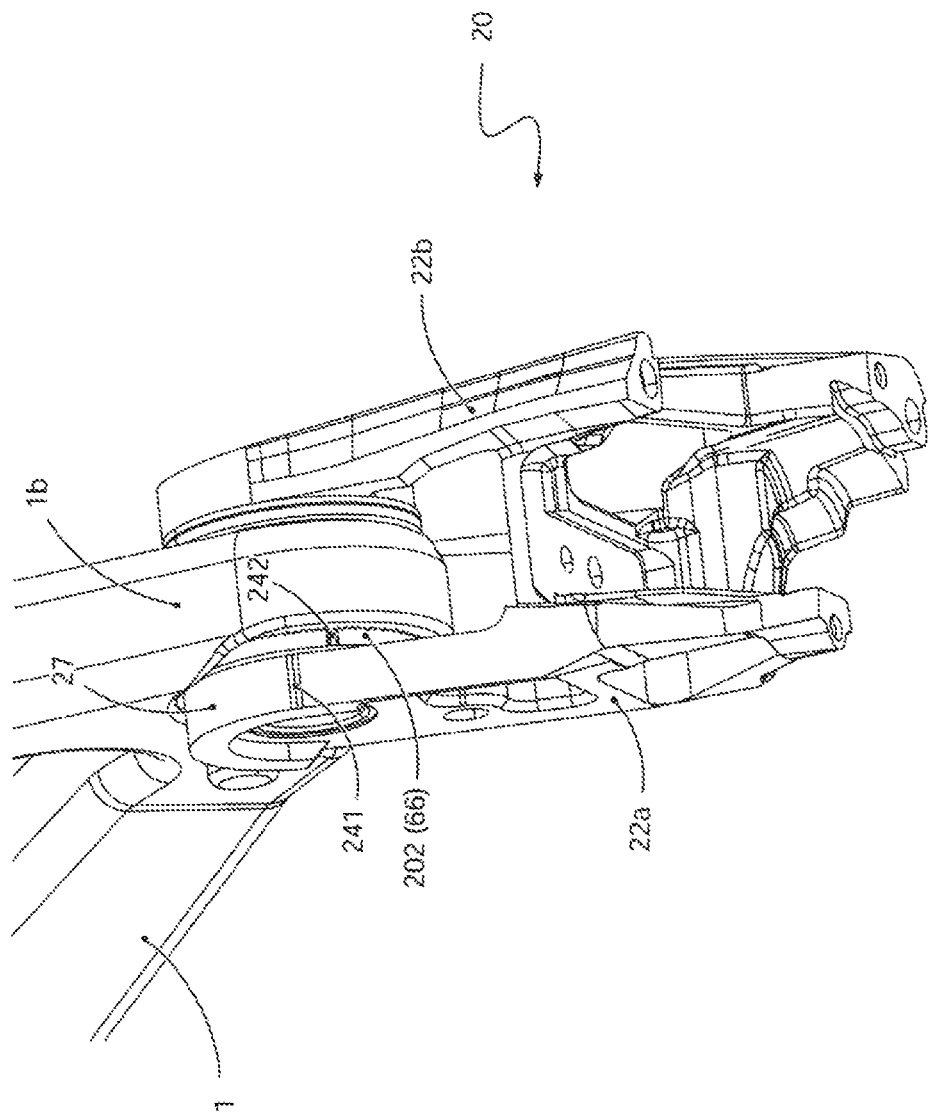
FIG. 14 shows the components of FIG. 13 seen from a somewhat other direction in the case of a malposition of the base element on the frame hanger.

The base element could be readjusted from this nominal position or normal position, respectively, by a crash or impacts on the base element 20, which would be easy to identify by the marks, or be indicated by the marks, respectively. The marks thus form a so-called "crash indicator". FIG. 14 shows the base element in a position pivoted from the nominal or normal position, after friction energy absorption, respectively, of said base element, for instance as a consequence of a crash, thus in a "crashed position", so to speak.

In comparison to the position according to FIG. 13, the base element 20 is pivoted to the rear. This has the result that the mark 240 on the inner arm 22a is pivoted forward in relation to the mark 242 on the external circumference of the external flange 22 of the adapter nut 66. The angular position of the adapter nut 66, by virtue of the friction-fitting fixation of the adapter nut 66 on the frame hanger 1b, continues to correspond to the previously adjusted normal position or nominal position of said adapter nut 66.

A cyclist which has suffered the crash can now readily adjust the nominal position of the base element 20 on the frame hanger again in that said cyclist loosens the stud axle 7 that is screwed into the adapter bolt 61 and, in conjunction with the stator assembly of the rear axle assembly, fixedly clamps the inner arm 22a, then resets the base element back to the pivoted position according to FIG. 13, and then tightens the stud axle again, thus restoring the axial clamping of the inner arm 22a.

FIG. 15 shows an exploded illustration of the base element 20 having the assigned components described in detail above. However, a variant embodiment having an adapter nut 66 of a slightly different embodiment is illustrated. Instead of the annular face 209 without a knurling radially within the spring groove 204, this inner annular region of the contact face of the adapter nut 66 that faces the frame hanger 1b is now also knurled.

The design of the spring element 106, which is embodied as a spring element of a substantially annular embodiment having an axial corrugation and a gap between two mutually facing spring ends, can also be seen. Accordingly, the spring groove 204 can also be embodied as an arcuate segment adapted to the former, thus having a presently knurled gap between two mutually adjacent groove ends. It is however also conceivable for the spring groove to be embodied as an annular groove.

FIG. 16 shows the components of FIG. 15 in a sectional exploded illustration, including the dropout, or the frame hanger 1b, respectively. The groove 220 of the adapter nut 66 for the annular element 218 (or the annular sliding element 218, respectively) can be readily seen in this sectional illustration. An annular engagement bead or engagement protrusion 221 on the internal circumference of the annular element 218 can furthermore be readily seen. As has been explained in the context of FIG. 5, the axially projecting bead region 248 of the inner arm 22a is assigned to the radial groove 220 of the adapter nut 66 in the overlap region of the adapter nut and the left arm 22a, and conjointly with the latter forms an axial overlap region of the adapter nut and the left arm of the base element.

A second exemplary embodiment of the present disclosure, in which only the points of differentiation in comparison to the first exemplary embodiment of FIGS. 5 to 16 will be explained, will now be described by means of FIGS. 17 to 21.

Figure 17:
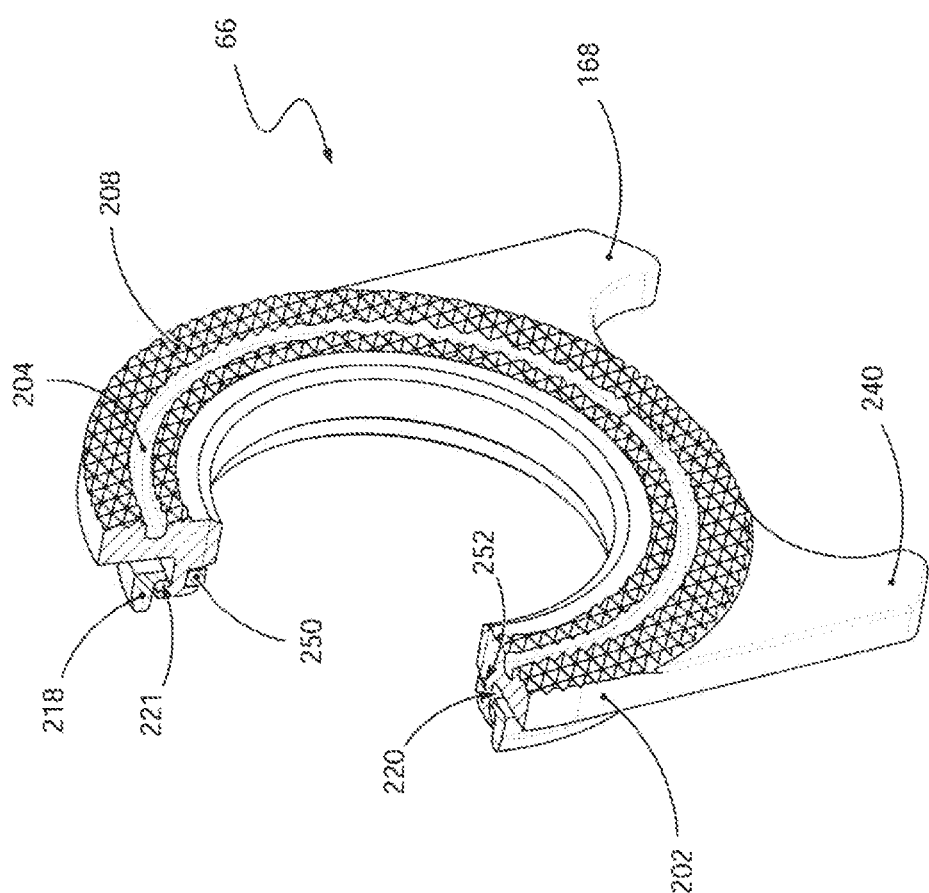
FIG. 17 shows a modified adapter nut of a second exemplary embodiment in a perspective, partially sectional view.

FIG. 17 shows the adapter nut 66 which corresponds substantially to the adapter nut 66 of the first exemplary embodiment according to FIG. 10, thus has two externally flanged detent regions 168 and 240. Deviating therefrom, the contact face region radially within the spring groove 204 is also knurled, as in the variant embodiment of FIGS. 15 and 16.

Figure 20:
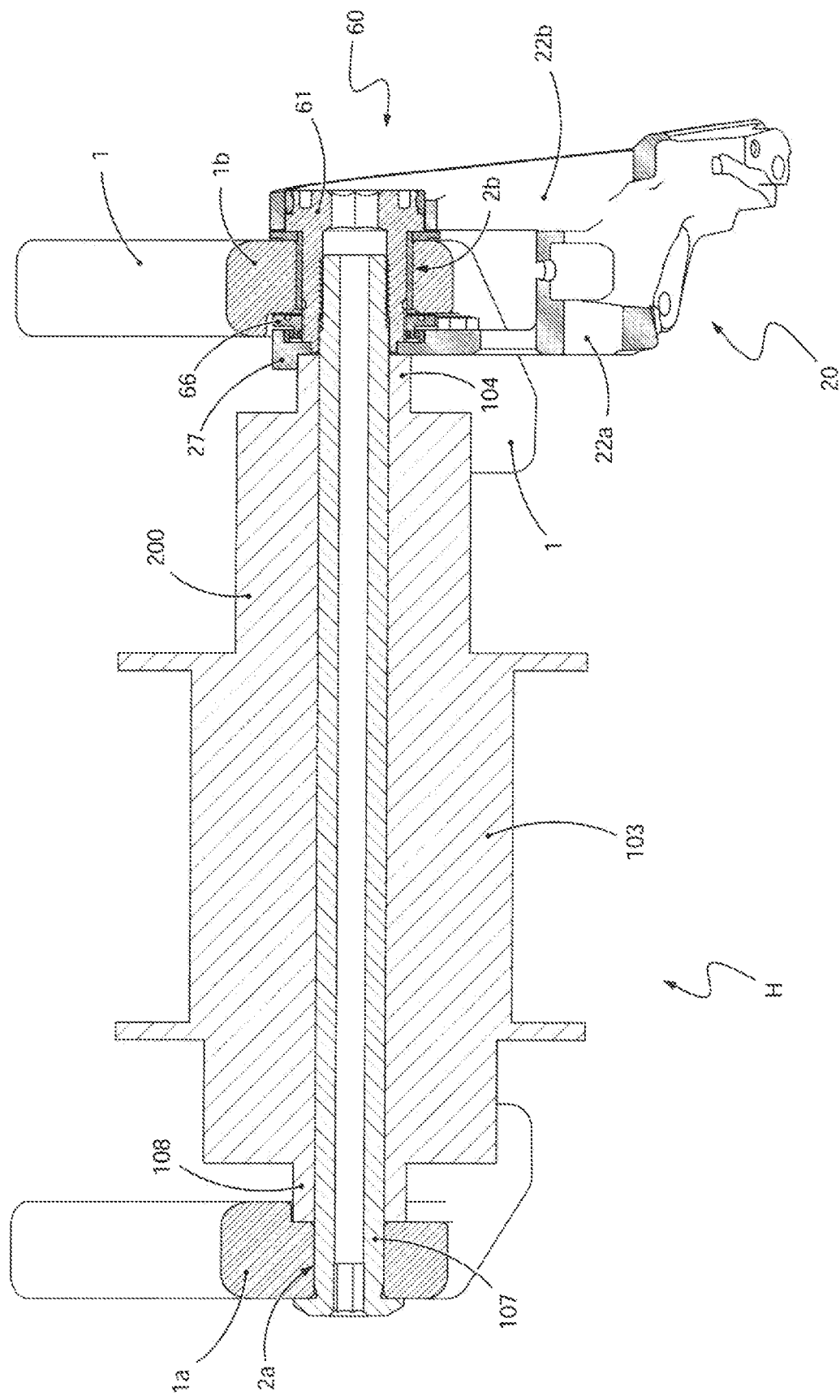
FIG. 20 shows the components of FIG. 19, including the rear tail of the bicycle frame illustrated in a sectional view.
Figure 21:
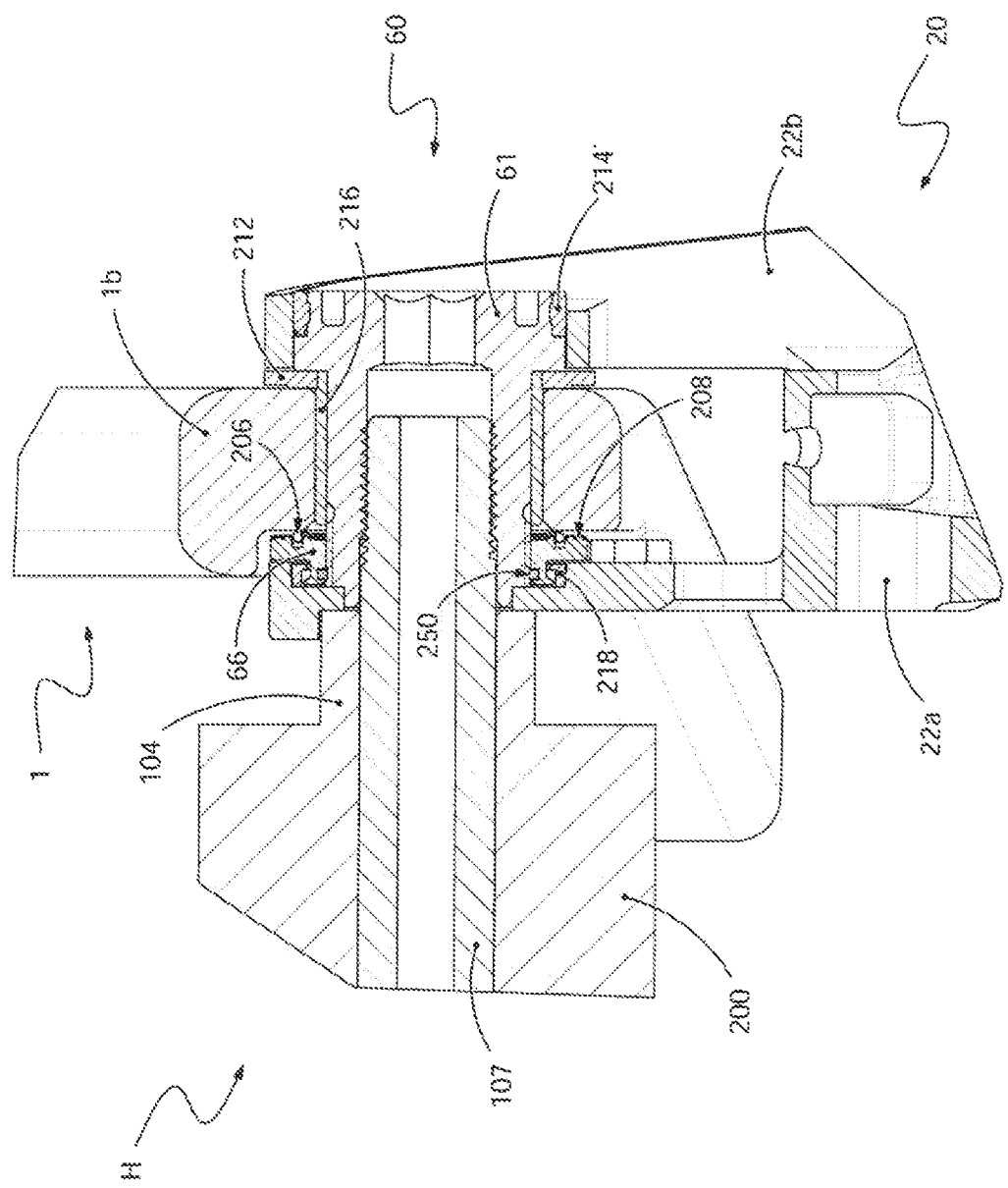
FIG. 21 corresponds to an enlarged illustration of the right frame hanger having the adapter of FIG. 20 according to one variant embodiment.

The second embodiment is however distinguished in comparison to the first embodiment in that the spring element 206 serving as the spacing element 206 is preferably omitted such that the spring groove 204 on the contact face of the adapter nut 66 could accordingly also be omitted. The spring groove 204 can however nevertheless be provided in order to reduce the diversity of parts when an embodiment with the spring element 206 and an embodiment without the spring element 206 are to be provided. In the case of an embodiment without the spring element 206, the existing spring groove 204 furthermore offers the option of retrofitting the spring element should this prove expedient. FIGS. 17 to 21 disclose an embodiment with the spring element 206 as well as an embodiment without spring element 206. The former embodiment is illustrated in FIG. 21.

A substantial difference between the second exemplary embodiment and the first exemplary embodiment lies in a preferably annular engagement element 250 which facilitates an indirect friction-fitting entraining engagement between the adapter nut 66 and the adapter bolt 61, so as to be able to exert increased rotational forces on the adapter nut 66 that are based on rotational forces directed into the adapter bolt 61. FIG. 17 shows the engagement element 250 received in an annular groove 252 of the adapter nut that is radially disposed within the annular groove 220 for the sliding element 218 and is open in a radially inward manner. This engagement element or this engagement ring 250 can also be referred to as a clamping ring and is typically produced from plastics material, for example polyamide. The clamping ring 270 acts in the manner of a corresponding clamping ring or clamping part of a self-locking nut or stop nut that servers as a screw locking mechanism.

When introducing and screwing the adapter bolt 61 into the adapter nut 66, this clamping ring is plastically and elastically deformed, where the elastic proportion in principle has the effect of a radially acting force-fitting locking mechanism securing the adapter nut 66 against loosening in relation to the adapter bolt 61. However, relevant here is not this force-fitting locking mechanism but the friction-fitting coupling of the adapter nut 66 to the adapter bolt 61 that is caused by the elastic proportion.

Figure 18:
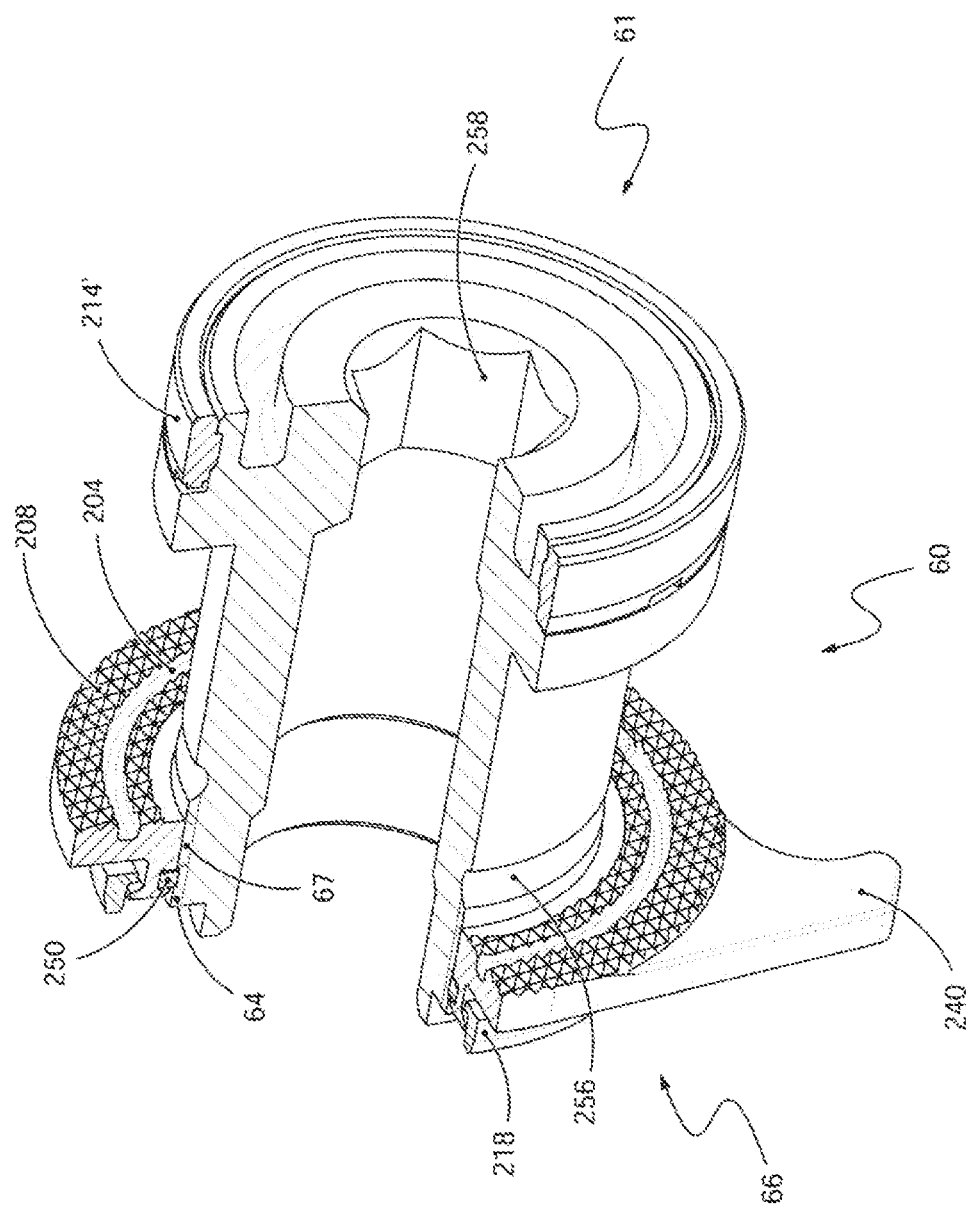
FIG. 18 shows the adapter nut of FIG. 17 including the associated adapter bolt screwed into the former.

FIG. 18 shows the adapter bolt 61 in the state thereof screwed into the adapter nut 66. A schematically illustrated external thread 64 of the adapter bolt that extends from an annular groove 256 on the external circumference of the adapter bolt to the inner end of the adapter bolt 61, as well as a schematically illustrated internal thread 67 of the adapter nut 66, can also be seen. This external thread and this internal thread in terms of the first exemplary embodiment can also be identified schematically illustrated in FIGS. 5A and 5B, but are not explicitly illustrated in the other previously discussed figures.

The clamping ring 250 thus ensures that increased rotational entrainment forces can be exerted on the adapter nut 66 by rotating the adapter bolt 61 in the tightening direction (or alternatively counter to the tightening direction, of course) by a tool introduced into a tool engagement opening 258 so that the provision of the spring element 206, serving as a spacer element, will typically be dispensable. The sliding ring 218 between the adapter nut 66 and the inner arm 22a of the base element 20 may optionally also be able to be dispensed with, to the extent that the focus is on exerting sufficient rotational forces on the base element by the adapter bolt 61 and the adapter nut 66 in order for the chain tension to be adjusted.

The embodiment of FIG. 18 differs from the first exemplary embodiment also by way of a bearing ring 214' instead of the bearing bush 214.

Figure 19:
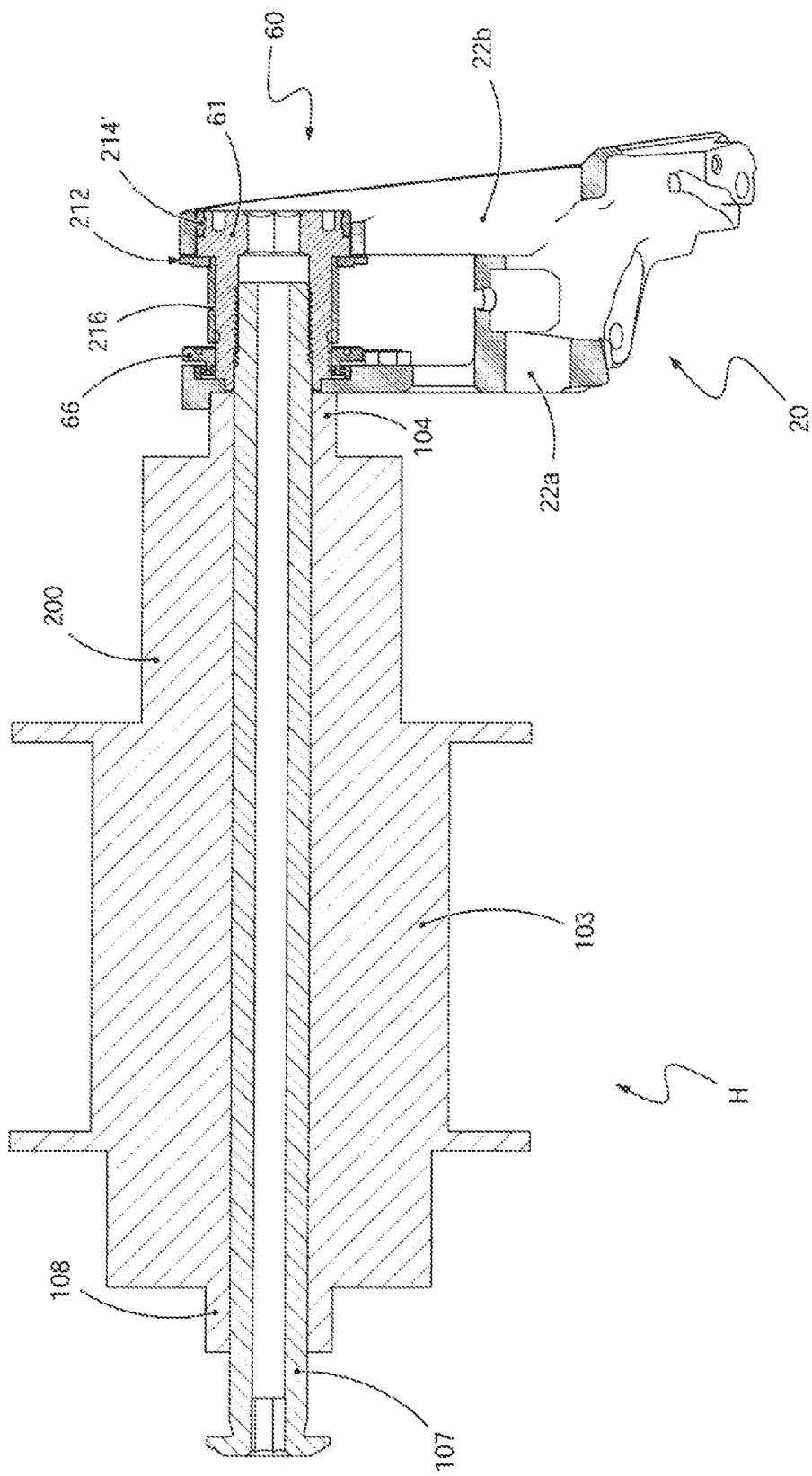
FIG. 19 shows the adapter including the adapter bolt and the adapter nut, including the base element and further associated components, including a schematically illustrated rear axle assembly.

FIG. 19 shows the components of FIG. 18 including the base element 20 and an associated rear wheel axle assembly that is illustrated in a substantially schematic manner and comprises a stud axis 7 that is screwed into the adapter bolt 61 and extends through a module H including stationary components 104, 107, 108 and rotational components 103, 200. FIG. 20 corresponds to this illustration. In addition, the left dropout 1a and the right dropout 1b, or the left frame hanger 1a and the right frame hanger 1b, respectively, of the rear tail 1 of the bicycle frame F are illustrated. As can be seen, the spring element 206 is not provided. In contrast, FIG. 21 shows the variant embodiment in which both the spring element 206 and the clamping ring 250 are present in an enlarged illustration.

A rear derailleur of a bicycle chain shift mechanism which is provided for the coaxial assembly—in terms of a rear axis A—on a mounting portion 1b of a bicycle frame F rear tail 1 of a bicycle, while using an adapter 60 including an adapter bolt 61 and an adapter nut 66, and has a dual-arm base element 20, a pivoting mechanism 30, a movable element 40, and a chain guide assembly 50, according to one aspect of the disclosure is distinguished by at least one engagement element 206/218/250 which facilitates an indirect friction-fitting engagement between the adapter nut 66, on the one hand, and at least one of a) an inner first arm 22a of the base element 20, b) an axial internal side of the mounting portion 1b and c) the adapter bolt 61, on the other hand, said engagement element 206/218/250 in a defined pre-assembled state acting in the sense of a reinforcement of a consequential rotational force being able to be exerted on the base element 20 by the adapter bolt 61 and the adapter nut 66.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A rear derailleur of a bicycle chain shift mechanism for the coaxial attachment—in terms of a rear axis on a bicycle frame rear tail of a bicycle, said rear derailleur comprising:
a base element;
a pivoting mechanism;
a movable element; and
a chain guide assembly;
wherein the pivoting mechanism connects the base element to the movable element, and the chain guide assembly, the latter by a force-accumulating assembly being pretensioned, or able to be pretensioned, in a chain-tensioning direction, being connected to the movable element to be rotatable about a rotation axis;
wherein the base element includes a first connecting end for the coaxial attachment—in terms of the rear axis—on the bicycle frame rear tail, and a second connecting end for coupling to the pivoting mechanism;
wherein the first connecting end has a first arm and a second arm which in the axial direction are disposed to be mutually spaced apart and, by an associated adapter, are specified for assembling the derailleur on an assigned mounting portion of a rear tail of the bicycle frame rear tail;
wherein, in a defined pre-assembled state and in a completely assembled state, the first arm is situated on an axial internal side of the mounting portion and the second arm is situated on an axial external side of the mounting portion;
wherein the adapter includes an adapter bolt and an associated adapter nut that is able to be screwed to the adapter bolt and, in the defined pre-assembled state and in the completely assembled state, a bolt head of the adapter bolt is disposed on the axial external side of the mounting portion, and the adapter nut that is screwed to engage with the adapter bolt is disposed on the axial internal side of the mounting portion; and
wherein, in the defined pre-assembled state, a rotational force is able to be exerted on the adapter nut by rotating the adapter bolt in a tightening direction, a consequential rotational force based on said rotational force by way of at least one entrainment formation of the adapter nut and at least one associated mating entrainment formation of the base element being able to be exerted on the base element which in the defined pre-assembled state is rotatable relative to the mounting portion in a first rotating direction corresponding to the tightening direction, said consequential rotational force acting counter to a counter rotational force exerted on the base element and, with the facilitation of a bicycle chain of the bicycle chain shift mechanism guided by the chain guide assembly, being exerted on the base element in a second direction counter to the first rotating direction;
wherein at least one engagement element which facilitates an indirect frictional engagement between the adapter nut, on the one hand, and at least one of a) the first arm of the base element, b) the axial internal side of the mounting portion and c) the adapter bolt, on the other hand, said engagement element acting in the sense of a reinforcement of the consequential rotational force being able to be exerted on the base element.

2. The rear derailleur according to claim 1, wherein at least one engagement element which is embodied and disposed so as to facilitate an indirect frictional engagement between the adapter nut, on the one hand, and the adapter bolt, on the other hand and, in the defined pre-assembled state, acts as in the sense of a reinforcement of the rotational force being able to be exerted on the adapter nut.

3. The rear derailleur according to claim 1, wherein at least one engagement element which is embodied and disposed so as to facilitate an indirect frictional engagement between the adapter nut, on the one hand, and at least one of a) the first arm of the base element and b) the axial internal side of the mounting portion, on the other hand, and, in the defined pre-assembled state, in the sense of a reinforcement of the consequential rotational force influences a momentary ratio between an original rotational force which is exerted on the adapter bolt in the tightening direction and rotates the latter relative to the mounting portion and the resulting consequential rotational force.

4. The rear derailleur according to claim 1, wherein at least one engagement element which is embodied so as to facilitate an indirect frictional engagement and, in the defined pre-assembled state, is clamped between the adapter nut and the adapter bolt and couples in a friction-fitting manner the adapter nut to the adapter bolt to provide a friction-fitting rotational entrainment of the adapter nut by the adapter bolt.

5. The rear derailleur according to claim 1, wherein at least one engagement element which is embodied so as to facilitate an indirect frictional engagement and, in the defined pre-assembled state, provides a friction bearing that is assigned to the first arm of the base element and to the adapter nut and reduces friction arising between the first arm of the base element and the adapter nut, to reduce counter forces acting counter to a rotation of the adapter nut in the first rotating direction.

6. The rear derailleur according to claim 1, wherein at least one engagement element which is embodied so as to facilitate an indirect frictional engagement and is held on the adapter nut and serves as an axial spacer element and is assigned to a contact face of the adapter nut and to a contact face of the axially inner side of the mounting portion, said contact face preferably being embodied as a knurled face, and, in the defined pre-assembled state, acting as an effective spacer element between said contact faces and keeping the contact face of the adapter nut and the contact face of the mounting portion to be axially spaced apart when the adapter bolt in the tightening direction is rotated beyond a provided angular rotating range of the adapter bolt, and before the contact face of the adapter nut comes to bear in an engaging manner with the assigned contact face of the mounting portion when the adapter bolt is further rotated in the tightening direction.

7. The rear derailleur according to claim 6, wherein an external flanged portion of the adapter nut forms the entrainment formation of the adapter nut, and a protrusion of the base element forms the mating entrainment formation, said protrusion from an external side of the first arm projecting axially in the direction towards the second arm and optionally being embodied as a separate detent bolt.

8. The rear derailleur according to claim 7, wherein, in the completely assembled state, the bolt head and the adapter nut are braced with the mounting portion by axial thread forces;
wherein the adapter nut on an axial side that faces the mounting portion is embodied with a knurled face which, in the completely assembled state, engages with the assigned contact face on the axial internal side of the mounting portion; and
wherein the adapter nut is embodied with an external flange which on an axial side that faces the mounting portion has a knurling that forms the knurled face or enlarges the latter in the radial direction, wherein the external flange in the completely assembled state extends into an axial gap between the first arm of the base element and the axial internal side of the mounting portion.

9. The rear derailleur according to claim 8, wherein the external flange is embodied as an annular flange that in an annular manner extends about a central region of the adapter nut which has a screw opening for the adapter bolt and, on the axial side of said external flange that faces the mounting portion has a knurling extending in an annular manner.

10. The rear derailleur according to claim 9, wherein the external flange forms a front detent for an assigned counter detent of the base element to, in the completely assembled state, support in a form-fitting manner on the adapter nut, the latter being tightly tensioned on the mounting portion, forces that act on the base element in a forward direction.

11. The rear derailleur according to claim 10, wherein the external flange forms a rear detent for an assigned counter detent of the base element to, in the defined pre-assembled state in which the adapter is not yet tightly tensioned, or in a state that corresponds to the pre-assembled state and in which the previously tightly tensioned adapter has been loosened, limit a pivoting angle of the base element relative to the mounting portion in a rearward direction.

12. The rear derailleur according to claim 1, wherein the base element, in the completely assembled state, on a clamping portion of the first arm thereof between the adapter and a stator module of a rear axle assembly associated with a rear road wheel of the bicycle is axially clamped and fixed in a friction-fitting manner against rotation, wherein a verification mark that permits at least one of a momentarily existing nominal angular positioning of the base element and a momentarily existing erroneous angular positioning, deviating from the nominal angular positioning, relative to at least one of the adapter nut, the mounting portion and the stator module to be identified, is provided.

13. The rear derailleur according to claim 12, wherein the verification mark has a first display element on a separate component that is at a fixed relative angular position relative to the base element, or preferably on the base element.

14. The rear derailleur according to claim 13, wherein the modification mark has a second display element on one of the adapter nut, the mounting portion and the stator module, or on a component that is at a fixed relative angular position relative to one of the adapter nut, the mounting portion and the stator module.

15. A bicycle comprising a bicycle frame having a rear road wheel and a chain shift mechanism having a rear derailleur, the bicycle comprising:
the rear road wheel embodied with a stator assembly including a rear axle assembly and a rotor assembly, wherein the rotor assembly is mounted so as to be rotatable relative to the stator assembly and includes a road wheel hub having a driver that supports a sprocket pack of the chain shift mechanism;
a rear tail of the bicycle frame rear tail has a left mounting portion and a right mounting portion for an internal axle of the rear axle assembly of the rear road wheel, said left mounting portion and said right mounting portion along a geometric axis having a predetermined defined axial spacing from the internal axle mounted on the frame rear tail by the mounting portions, and forming in each case a counter bearing for a component group that is disposed on the internal axle, clamped between the mounting portions and including a module of the stator assembly;
the rear derailleur in terms of the geometric axis is mounted to be coaxial on the bicycle frame rear tail and comprises:
a base element;
a pivoting mechanism;
a movable element; and
a chain guide assembly;
wherein the pivoting mechanism connects the base element to the movable element, and the chain guide assembly, the latter by a force-accumulating assembly being pretensioned, or able to be pretensioned, in a chain-tensioning direction, being connected to the movable element to be rotatable about a rotation axis;
wherein the base element includes a first connecting end or the coaxial attachment—in terms of the geometric axis—on the bicycle frame rear tail, and a second connecting end for coupling to the pivoting mechanism;
wherein the first connecting end has a first arm and a second arm which in the axial direction are disposed to be mutually spaced apart and, by an associated adapter, are specified for assembling the derailleur on the assigned right mounting portion of the rear tail, wherein the adapter includes an adapter bolt and an associated adapter nut that is able to be screwed to the adapter bolt;
wherein the first arm is situated on an axial internal side of the assigned mounting portion and the second arm is situated on an axial external side of the assigned mounting portion; and wherein a bolt head of the adapter bolt is disposed on the axial external side of the mounting portion, and the adapter nut that is screwed to engage with the adapter bolt is disposed on the axial internal side of the mounting portion;

wherein the rear derailleur is completely assembled on the bicycle frame rear tail.

\* \* \* \* \*